(12) United States Patent
Khoryaev et al.

(10) Patent No.: US 9,185,620 B2
(45) Date of Patent: Nov. 10, 2015

(54) ADAPTIVE UL-DL CONFIGURATIONS IN A TDD HETEROGENEOUS NETWORK

(71) Applicant: Intel Corporation, Santa Clara, CA (US)

(72) Inventors: Alexey Khoryaev, Dzerzhinsk (RU); Sergey Panteleev, Nizhny Novgorod (RU); Mikhail Shilov, Nizhny Novgorod (RU); Andrey Chervyakov, Nizhny Novgorod (RU); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 170 days.

(21) Appl. No.: 13/688,417

(22) Filed: Nov. 29, 2012

(65) Prior Publication Data

US 2013/0322235 A1   Dec. 5, 2013

Related U.S. Application Data

(60) Provisional application No. 61/653,369, filed on May 30, 2012.

(51) Int. Cl.
*H04W 36/20*   (2009.01)
*H04W 28/02*   (2009.01)
*H04W 28/08*   (2009.01)
(Continued)

(52) U.S. Cl.
CPC .............. *H04W 36/20* (2013.01); *H04N 21/24* (2013.01); *H04W 24/10* (2013.01); *H04W 28/0289* (2013.01); *H04W 28/08* (2013.01);
(Continued)

(58) Field of Classification Search
CPC . H04W 36/04; H04W 28/0289; H04W 36/22; H04W 24/10; H04W 52/244; H04W 36/20; H04N 21/24
See application file for complete search history.

(56) References Cited

U.S. PATENT DOCUMENTS

| 2010/0246456 A1 | 9/2010 | Suo et al. |
| 2011/0235584 A1 | 9/2011 | Chen et al. |

(Continued)

FOREIGN PATENT DOCUMENTS

| WO | WO 2011/127435 A1 | 10/2011 |
| WO | WO 2013/112665 | 1/2013 |

OTHER PUBLICATIONS

Catt et al.; New study item proposal for Further Enhancements to LTE TDD for DL-UL Interference Management and Traffic Adaptation; 3GPP TSG-RAN Meeting #51; RP-110450; Mar. 15-18, 2010; 7 pages.; Agenda Item 14.2; Kansas City, USA.

(Continued)

*Primary Examiner* — Omer S Mian
(74) *Attorney, Agent, or Firm* — Thorpe North & Western LLP

(57) ABSTRACT

Technology for traffic offloading to generate a low interference flexible subframe (FlexSF) of an adaptive uplink-downlink (UL-DL) time-division duplexing (TDD) subframe configuration in a heterogeneous network (HetNet) is disclosed. One method can include an evolved Node B (eNB) monitoring a traffic loading metric for a specified traffic loading condition. The eNB can offload traffic scheduled for a packet of a macro user equipment (UE) from a macro cell to a FlexSF of a UL-DL subframe configuration of a small cell when the specified traffic loading condition exists. The eNB can be a macro eNB of the macro cell or a small eNB of the small cell.

23 Claims, 15 Drawing Sheets

(51) Int. Cl.
*H04W 24/10* (2009.01)
*H04N 21/24* (2011.01)
*H04W 36/22* (2009.01)
*H04W 36/04* (2009.01)
*H04W 28/10* (2009.01)

(52) U.S. Cl.
CPC ............. *H04W 36/22* (2013.01); *H04W 28/10* (2013.01); *H04W 36/04* (2013.01)

(56) References Cited

U.S. PATENT DOCUMENTS

| | | |
|---|---|---|
| 2011/0310830 A1* | 12/2011 | Wu et al. .................... 370/329 |
| 2012/0076106 A1 | 3/2012 | Bhattad et al. |
| 2012/0302261 A1* | 11/2012 | Tinnakornsrisuphap et al. ................... 455/456.4 |
| 2013/0084864 A1* | 4/2013 | Agrawal et al. ............... 455/436 |
| 2013/0194982 A1 | 8/2013 | Fwu et al. |
| 2013/0242812 A1 | 9/2013 | Khoryaev et al. |
| 2013/0272170 A1 | 10/2013 | Chatterjee et al. |
| 2013/0343241 A1* | 12/2013 | Niu et al. ..................... 370/280 |
| 2014/0056186 A1* | 2/2014 | Gao et al. .................... 370/280 |
| 2014/0056190 A1* | 2/2014 | Qian et al. ................... 370/280 |

OTHER PUBLICATIONS

Intel Corporation; Performance analysis of DL-UL interference management and traffic adaptation in multi-cell Pico-Pico development scenario; 3GPP TSG-RAN WG1 #68bis; R1-121529; Mar. 26-30, 2012; 12 pages; Agenda Item 7.10.1; Jeju, Korea.

Mediatek Inc.; Consideration on a transmit-side solution with subframe shifing; 3GPP TSG-RAN WG1 #66bis; R1-113049; Oct. 10-14, 2011; 3 pages; Afgenda Item 7.3.2; Zhuhai, China.

Qualcomm Incorporated; eICIC ABS pattern Considerations; 3GPP TSG-RAN WG4 meeting #57; R4-104151; Nov. 15-19, 2010; g pages; Agenda item 15.5.1; Jacksonville, United States.

Rapporteur (Huawei); Conclusion on further evaluation assumptions for LTE TDD DL-UL Interference Management and Traffic Adaptation; 3GPP TSG RAN WG1 meeting #68bis; R1-121923; Mar. 26-30, 2012; 10 pages; Agenda Item 7.10; Jeju, Korea.

ZTE; Support to Live-Change of Downlink-Uplink Allocation Ratio in LTE/TDD; 3GPP TSG RAN WG1 Meeting #52bis; R1-0841415; Mar. 31-Apr. 4, 2008; 13 pages; Agenda Item 6.1.6; Shenzhen, China.

PCT application PCT/US2013/041145; filed May 15, 2013; Intel Corporation et al.; International Search Report mailed Sep. 12, 2013.

* cited by examiner

ADAPTIVE UL-DL CONFIGURATIONS IN A TDD HETEROGENEOUS NETWORK

RELATED APPLICATIONS

This application claims the benefit of and hereby incorporates by reference U.S. Provisional Patent Application Ser. No. 61/653,369, filed May 30, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

Homogeneous networks or HetNets can use time-division duplexing (TDD) or frequency-division duplexing (FDD) for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers. In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 14:
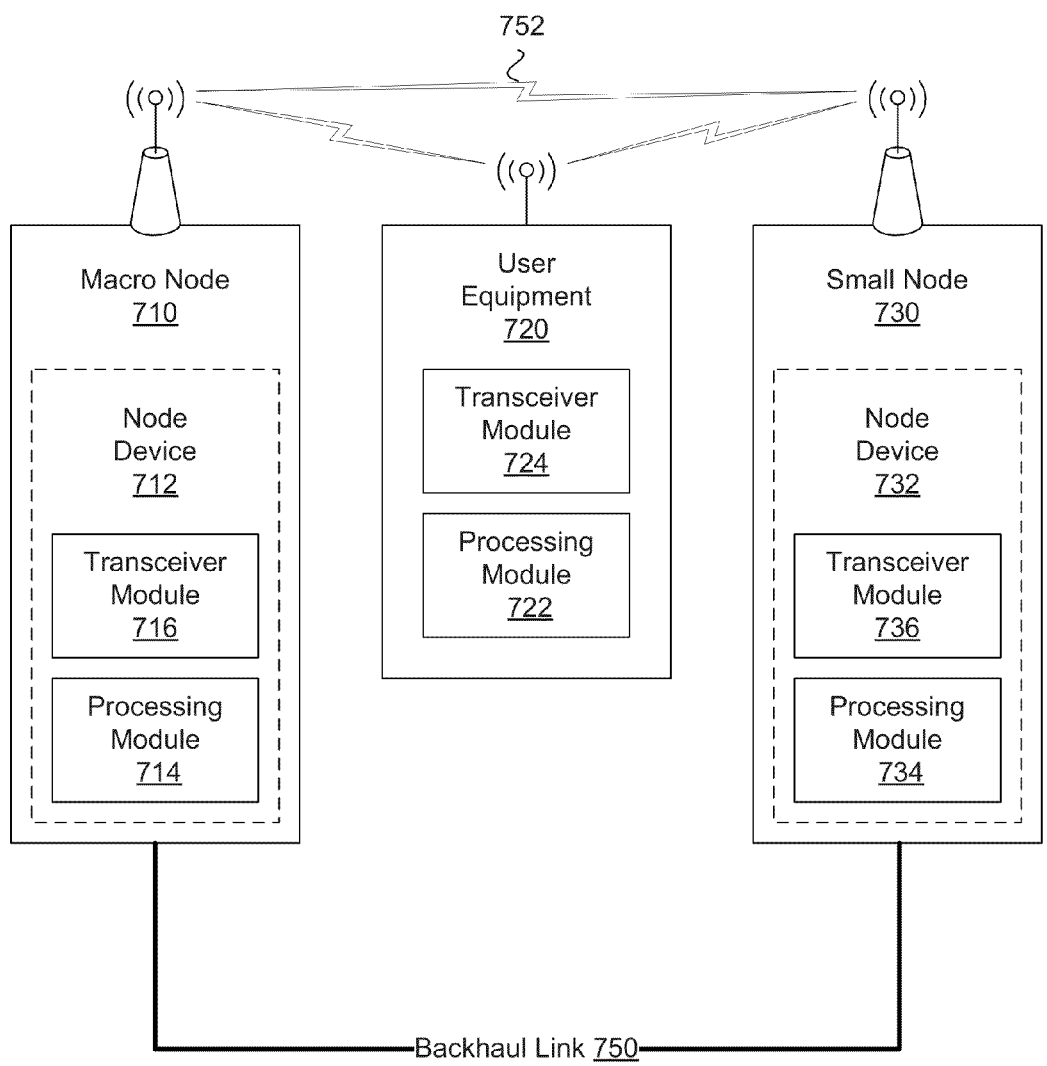
Figure 15:
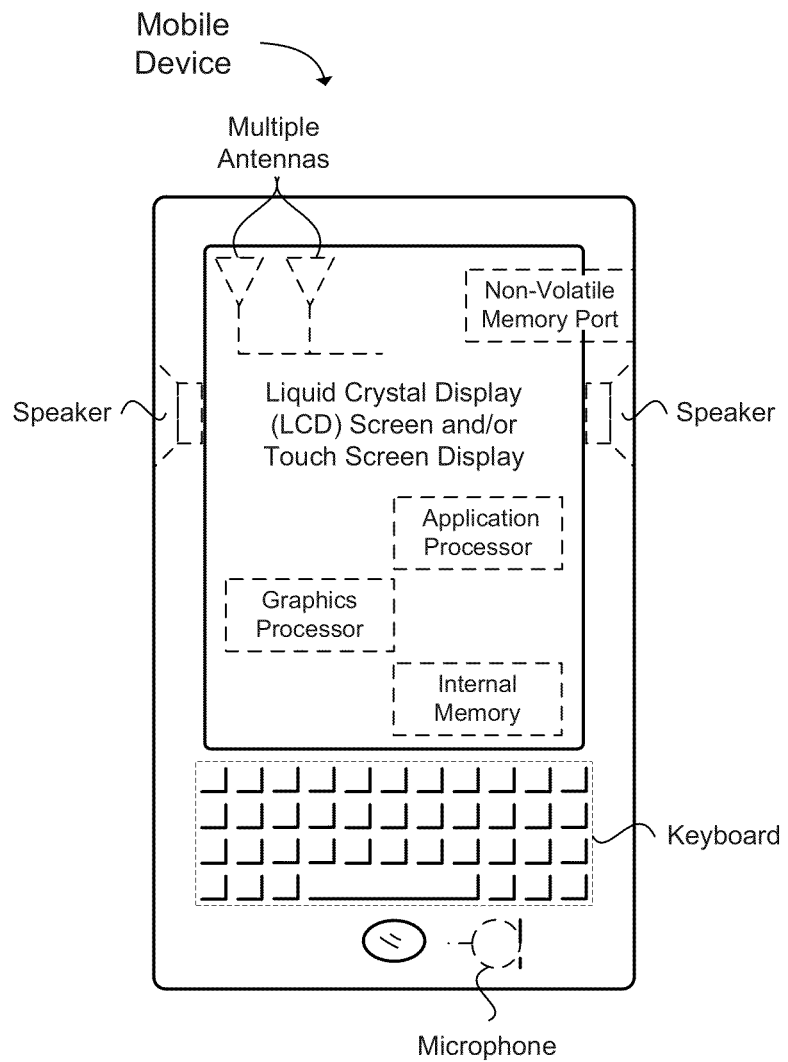

of an adaptive uplink-downlink (UL-DL) time-division duplexing (TDD) subframe configuration in a heterogeneous network (HetNet) in accordance with an example;

FIG. 14 illustrates a block diagram of a macro node, a low power node (LPN), and a user equipment (UE) in accordance with an example; and FIG. 15 illustrates a diagram of a wireless device (e.g., user equipment (UE)) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
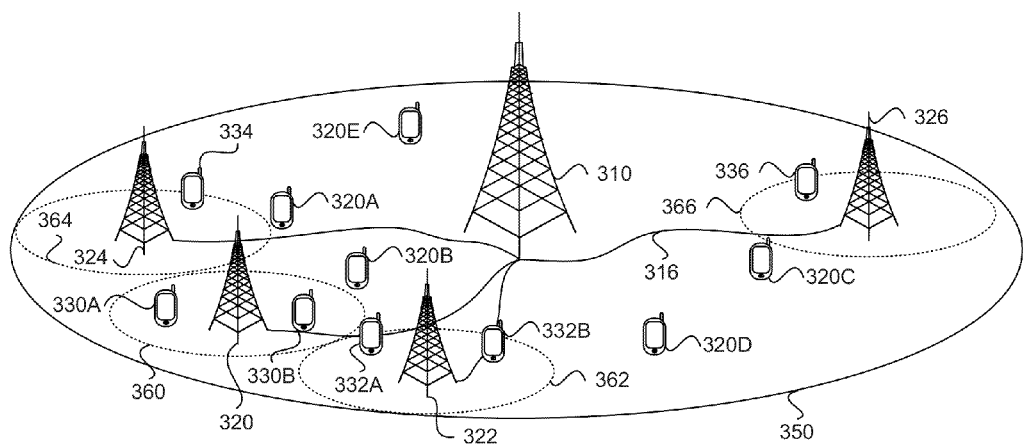
FIG. 1 illustrates a diagram of a heterogeneous network (HetNet) with a macro evolved Node B (eNB) in a macro cell and low power nodes (LPNs) of a small cell in accordance with an example.

FIG. 1 illustrates a heterogeneous network (HetNet) with a macro node 310 (e.g., macro evolved Node B (eNB)) in a macro cell and multiple low power nodes (LPNs) 320, 322, 324, and 326 (or small eNBs) in the respective small cells. As used herein, a cell can refer to the node or the coverage area of the node. A low power node (LPN) can refer to a small node, which can include a small eNB, a micro eNB, a pico node, a pico eNB, a femto-eNB, a home eNB (HeNB), a remote radio head (RRH), a remote radio equipment (RRE), or a remote radio unit (RRU). As used herein, the term "small node" may be used interchangeably with the term "pico node" (or pico eNB), and the term "small cell" may be used interchangeably with the term "pico cell" in the examples to assist in distinguishing between the macro node and the LPN or the small node, and the macro cell and the small cell. The macro node can be connected to each LPN via backhaul link 316 using X2 interface or optical fiber connections.

The HetNet can include macro nodes 310 that can typically transmit at high power level, for example, approximately 5 watts (W) to 40 W, to cover the macro cell 350. The HetNet can be overlaid with low power nodes (LPNs) 320, 322, 324, and 326, which may transmit at substantially lower power levels, such as approximately 100 milliwatts (mW) to 2 W. In an example, an available transmission power of the macro node may be at least ten times an available transmission power of the low power node. A LPN can be used in hot spots or hot-zones, referring to areas with a high wireless traffic load or high volume of actively transmitting wireless devices (e.g., user equipments (UEs)). A LPN can be used in a microcell, a picocell, a femtocell, and/or home network.

In the example of FIG. 1, a wireless device (e.g., UE) 320A-E, 330A-B, 332A-B, 334, and 336 can be served by the macro node 310 or one the LPN 320, 322, 324, and 326. Wireless devices can be described in relation to the cells (e.g., nodes) in a network. For example, the HetNet can include a macro cell and four small cells. Wireless devices primarily served by the macro node 310 in the macro cell coverage area 350 can be referred to as macro UEs (MUEs) 320A-E. Wireless devices primarily served by the small node 320, 322, 324, and 326 (e.g., LPN or pico node) in the small cell coverage area 360, 362, 364, and 366 (e.g., pico cell) can be referred to as pico UEs (PUEs) 330A-B, 332A-B, 334, and 336.

HetNet deployments have been recognized to offer efficient means to increase cellular coverage and capacity compared to traditional homogeneous networks and may involve the co-existence of different radio access technologies, transmission-reception techniques, and base station (BS) transmission powers among other possible architectural combinations. For time-division duplexing (TDD) systems and networks, allowing adaptive uplink-downlink (UL-DL) subframe configurations depending on traffic conditions in different cells can significantly improve system performance. Legacy LTE TDD can support asymmetric UL-DL allocations by providing seven different semi-statically configured uplink-downlink subframe configurations. Table 1 illustrates seven UL-DL configurations used in legacy LTE, where "D" represents a downlink (DL) subframe, "S" represents a special subframe, and "U" represents an uplink (UL) subframe. The special subframe can operate similar to downlink subframe relative to the transmission direction.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 1, UL-DL configuration 0 can include 6 uplink subframes in subframes 2, 3, 4, 7, 8, and 9, and include 4 downlink or special subframes in subframes 0, 1, 5, and 6; and UL-DL configuration 5 can include one uplink subframe in subframe 2, and include 9 downlink or special subframes in subframes 0, 1, 3, 4, 5, 6, 7, 8, and 9. The UL-DL configuration 0 can be considered an uplink favored UL-DL configuration, and UL-DL configuration 5 can be considered a downlink favored UL-DL configuration. Advanced UL-DL configuration may not constrain subframes 0 and 5 to be DL subframes, subframe 1 to be a special subframe, or subframe 2 to be an UL subframe. In some advanced UL-DL configurations, each subframe can allow opposite transmission directions, so subframes 0, 1, 2, and 5 can be a DL, UL, or special subframe.

In an example, cells (e.g., macro cell and small cells) of the network can change the UL-DL configurations synchronously in order to avoid the interference with other cells. However, such a requirement can constrain the traffic management capabilities in different cells of the network. The existing set of legacy TDD UL-DL configurations can provide DL subframe allocations in the range between 40% to 90%, as shown in Table 1. With legacy LTE, the UL and DL subframes allocation within a radio frame can be reconfigured through system information broadcast signaling. Hence, the UL-DL allocation once configured may be expected to vary semi-statically, in an example. Predetermined or semi-statically configured UL-DL configurations may not match an instantaneous traffic situation resulting in inefficient resource utilization, especially in cells with a small number of users (e.g., UEs) that download or upload large amounts of data. Adaptive UL-DL configurations can be used to handle cell-dependent traffic asymmetry and match instantaneous traffic situations. For such TDD LTE deployments with different UL-DL configurations in different cells, new types of interferences including BS-to-BS and UE-to-UE interference can be generated. A type of interference that can impair functionality of the network can be the inter-cell DL→UL (BS-to-BS) interference, which may significantly reduce the benefits obtained from the adaptability of UL-DL configurations in different cells.

The strong level of BS-BS (DL-UL) interference between macro cells (in a homogeneous network) or between a macro cell and small cells (in a HetNet) can make dynamic adaptation of UL-DL configuration difficult to implement. To resolve issues with BS-BS interference in an example, the LTE-TDD networks can align transmission directions of each subframe of the macro cells with the subframes of other cells so the cells work synchronously with each other, effectively avoiding DL-UL inter-cell interference.

In another example, the adaptive change of UL-DL configurations at the lower power nodes can provide substantial increase of packet throughput to the LPN users, even after compensating for the additional interference. A dynamic adjustment of UL-DL configurations can be feasible for single operator macro-pico and macro-femto deployments when macro and low power nodes (e.g., pico nodes or femto nodes) operate in adjacent carrier frequencies. A dynamic adjustment of UL-DL configurations can also be feasible in scenarios where macro and LPNs work in a co-channel and LPNs adjust the UL-DL configuration to instantaneous traffic conditions. Some technical challenges in macro-pico co-channel scenario with dynamic adaptation of UL-DL configurations at pico stations can include the DL-UL interference on macro-pico and pico-pico links. Technology described herein can resolve or mitigate the DL-UL interference and provide effective applications to a macro-pico co-channel scenario with dynamic adaptation of UL-DL configurations at pico stations (e.g., pico nodes).

Figure 2:
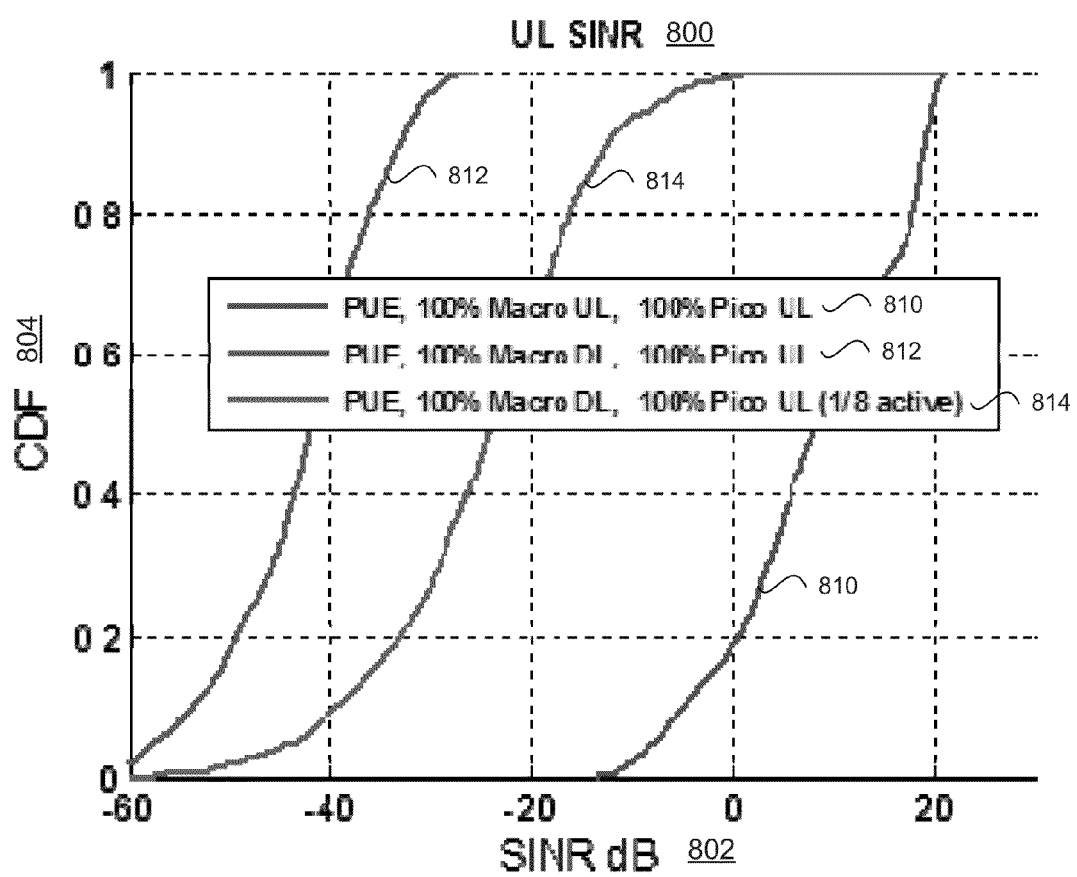
FIG. 2 illustrates a uplink (UL) signal-to-noise-and-interference ratio (SINR) analysis for a user equipment served by a pico node (PUE) using various macro node and pico node subframe configurations in accordance with an example.
Figure 3:
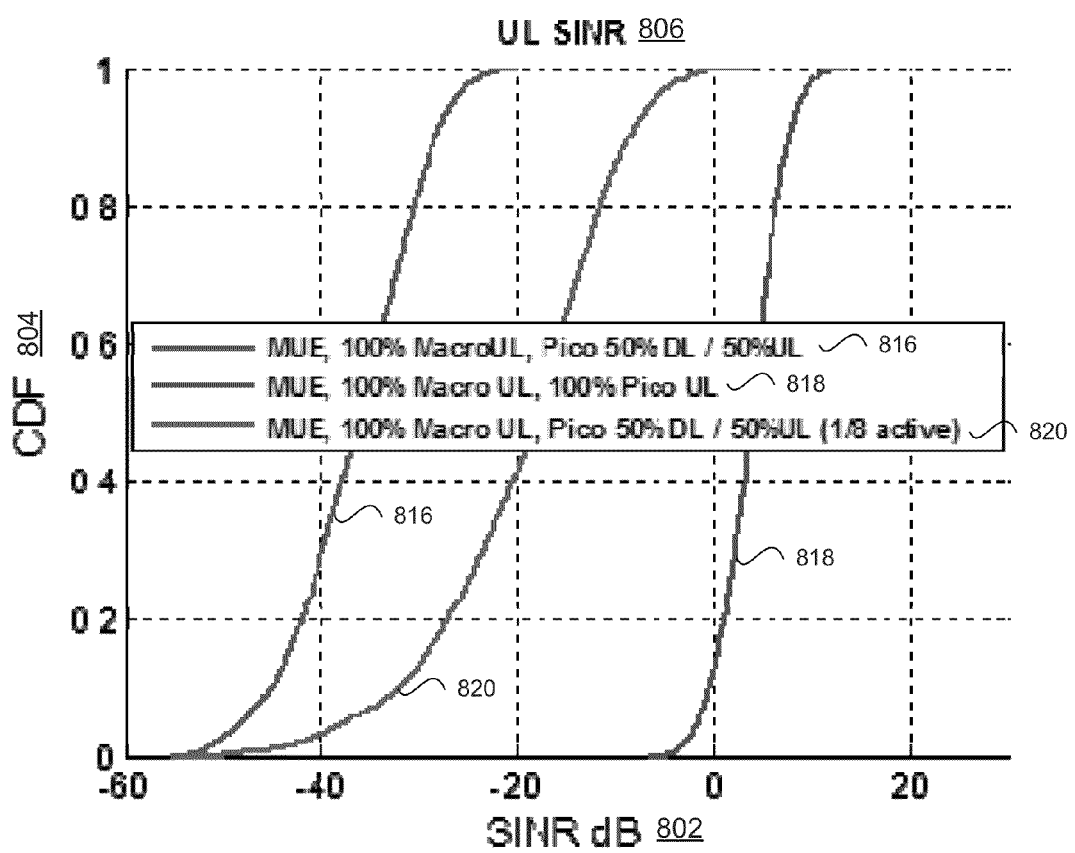
FIG. 3 illustrates a uplink (UL) signal-to-noise-and-interference ratio (SINR) analysis for a user equipment served by a macro node (MUE) using various pico node subframe configurations in accordance with an example.

FIGS. 2 and 3 illustrate a system level analysis of the impact of DL inter-cell interference on UL performance of pico UEs (PUEs) (in FIG. 2) and macro UEs (MUEs) (in FIG. 3) using an enhanced interference management and traffic adaptation (eIMTA) geometry signal-to-noise-and-interference ratio (SINR) evaluation methodology. FIG. 2 illustrates the simulation results with UL SINR 800 analysis for pico UEs, and FIG. 3 illustrates the simulation results with UL SINR 806 analysis for macro UEs. The x-axis represents the SINR 802 measured in decibels (dB) and the y-axis represents the cumulative distribution function (CDF) 804. The CDF (or distribution function) in probability theory or statistics, describes a probability that a real-valued random variable X with a given probability distribution can be found at a value less than or equal to x.

In FIG. 2, the simulation results show the UL SINR 800 (a measurement for interference) for PUE for two cases 810 and 812 where all the macro and pico nodes are active (i.e., full system loading), including a case 810 where 100% of the macro subframes are configured as UL subframes, and another case 812 where 100% of the macro subframes are configured as DL subframes. 100% of the pico subframes are configured as UL subframes during the UL to the PUE. The simulation results also show the SINR for a partial system loading case 814 where one-eighth (⅛) part of macro and pico cells is randomly activated, where 100% of the macro subframes are configured as DL subframes. The partial system loading case illustrates the potential interference environment at low system loadings.

In FIG. 3, the simulation results show the UL SINR 806 for MUE for two cases 816 and 818 where all the macro and pico nodes are active, including a case 816 where 50% of the pico subframes are configured as DL subframes and 50% of the pico subframes are configured as UL subframes, and another case 818 where 100% of the pico subframes are configured as UL subframes. 100% of the macro subframes are configured as UL subframes during the UL to the MUE. The simulation results also show the SINR for a partial system loading case 820 where one-eighth (⅛) part of macro and pico cells is randomly activated, where 50% of the pico subframes are configured as DL subframes and 50% of the pico subframes are configured as UL subframes.

An observation from the simulation results of FIGS. 2 and 3 can be that macro and pico cells can have a strong coupling on macro-pico links. The strong DL inter-cell interference from macro and pico stations (i.e., nodes) can result in a significant UL performance degradation of PUEs and MUEs, respectively. A poor UL SINR performance can be a bottleneck that can prevent dynamic adaptation of UL-DL configuration in macro-pico co-channels scenarios.

Interference management and traffic adaptation (IMTA) methods can be used to efficiently resolve the DL-UL interference and extract benefits from traffic adaptation in the macro-pico co-channel scenario. For example, methods such as isolated cell clustering interference mitigation (CCIM) and reduced transmit power on flexible subframes (FlexSF) can be used to mitigate DL-UL interference. In isolated CCIM, pico cells generating interference (which can be determined using path-gains) on each other above a specified (or predetermined) threshold are grouped or clustered together and operate using a same UL-DL configuration. Pico cells not generating interference or generating interference on each other below the specified (or predetermined) threshold can be considered as isolated from the other pico cell groups or clusters and operate independently of the other pico cell groups or clusters allowing the isolated pico cell or pico cluster to change the UL-DL configuration without coordination with other pico cell groups or clusters.

The isolated CCIM method can be effective for pico-pico co-channel deployment scenario, but may not be as effective for macro-pico co-channel deployment scenarios. For example, the isolated CCIM method can be potentially generalized for the case of macro-pico co-channel deployment to address the problem of DL inter-cell interference from pico cells on UL transmissions of macro UEs (MUEs). According to the isolated CCIM method the path-gains of pico-macro links can be measured and used to form clusters that consist from macro and/or pico cells. The pico cells that have a strong coupling with the macro cell can use a same UL-DL configuration as the macro cells and the remaining pico cells can be considered as isolated cells or can form isolated clusters from pico cells with a weak coupling with the macro cell. A drawback of macro-pico isolated CCIM can substantially limit the traffic adaptation capabilities of pico cells.

Figure 4:
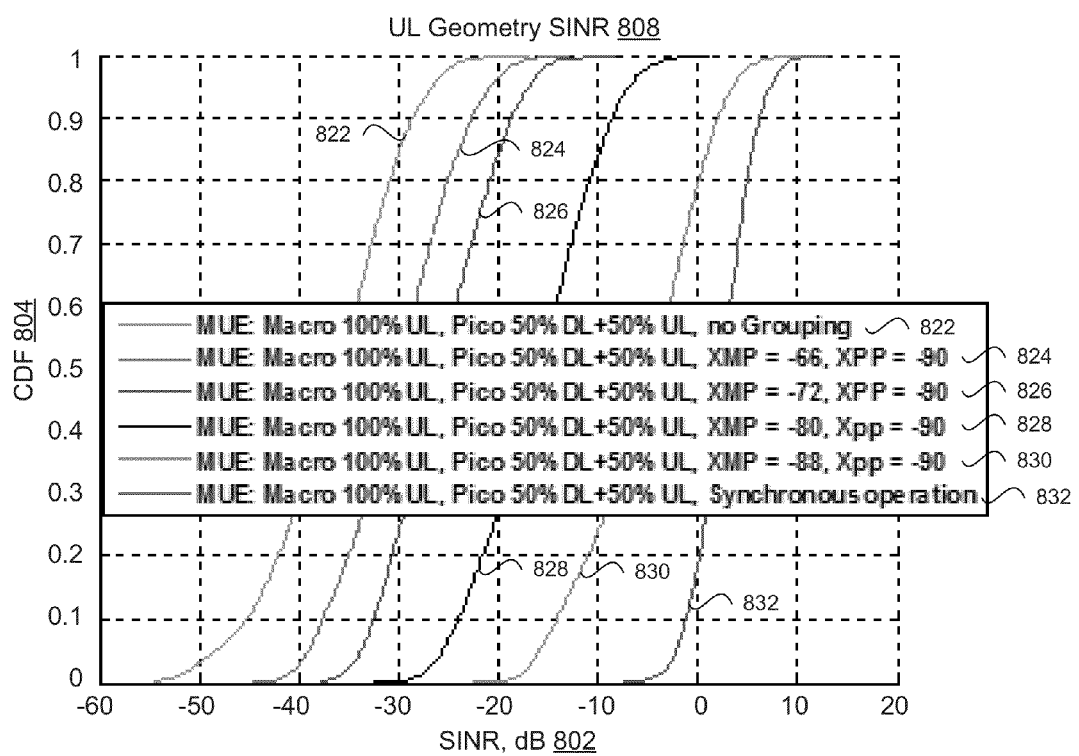
FIG. 4 illustrates a uplink (UL) signal-to-noise-and-interference ratio (SINR) analysis for a user equipment served by a macro node (MUE) for various macro-to-pico and pico-to-pico pathgain thresholds in accordance with an example.
Figure 5:
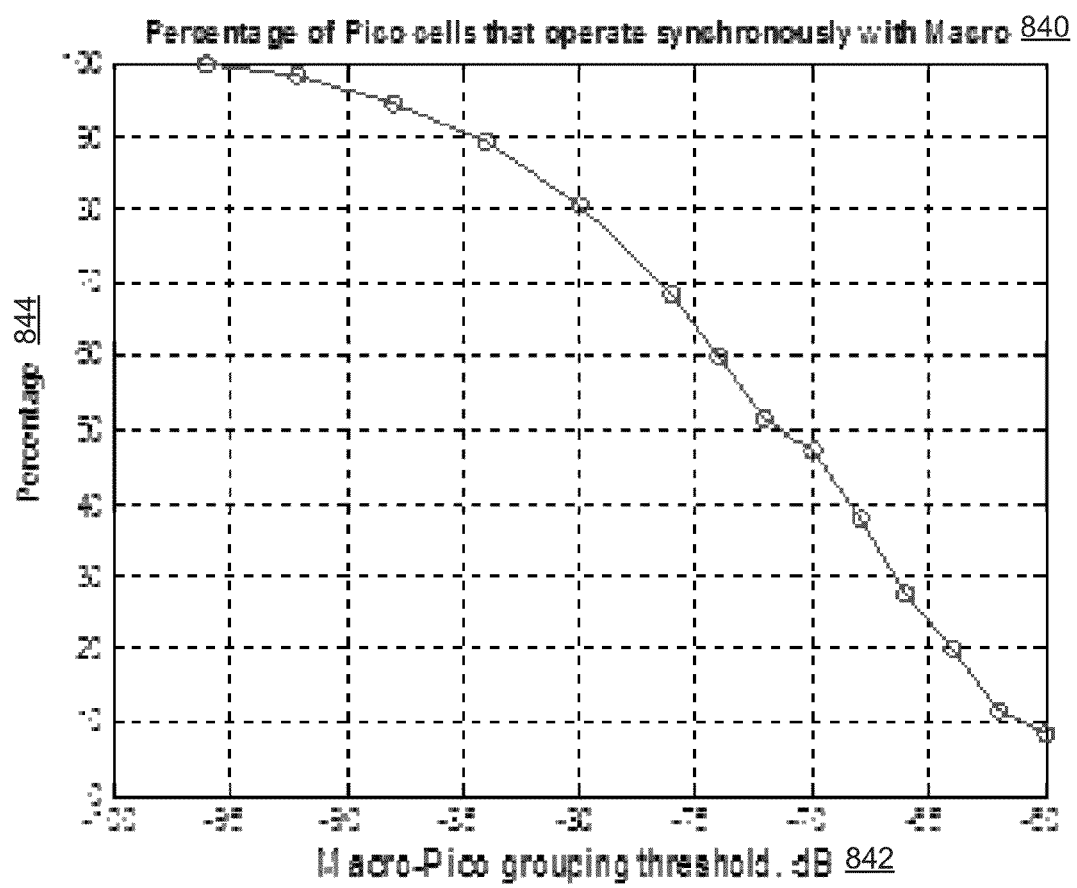
FIG. 5 illustrates a percentage of pico cells that operate synchronously with a macro node for various macro-to-pico grouping thresholds in accordance with an example.

FIG. 4 illustrates the macro UE UL SINR 808 based on various macro-pico path gain thresholds ($X_{MP}$) 822-832 with a constant pico-pico path gain threshold ($X_{PP}$). FIG. 4 shows that the UL SINR of the macro UEs can improve with the decrease of $X_{MP}$. The UL SINR performance improves as more pico cells operate synchronously with the macro cells, as illustrated in FIG. 5. FIG. 5 illustrates a percentage 844 of pico cells that operate synchronously with a macro node 840 for various macro-to-pico grouping thresholds 842, measured in dB. To achieve a same macro UE UL SINR performance as in synchronous TDD systems, in an example, all pico cells operate synchronously with the macro cells. For this reason, the IMTA isolated cell clustering method may not be optimal for a macro-pico co-channel scenario.

Another approach to mitigate the negative impact from DL inter-cell interference from pico stations on UL performance of macro UEs can be to reduce the transmission power on flexible subframes (FlexSF) of pico stations. A FlexSF can be a subframe that may change transmission directions from one UL-DL configuration to another. For legacy LTE UL-DL configuration, the FlexSF can include subframes 2, 3, 4, 7, 8, and 9. For advanced UL-DL configurations, the FlexSF can include any subframe that can change transmission directions from one UL-DL configuration to another (e.g., subframes 0-9). Similarly, the negative impact from DL inter-cell interference from macro node on UL performance of pico UEs can be mitigated by reducing the transmission power on the FlexSF of macro stations.

Offloading macro user traffic from the macro node to the pico node and subframe muting (referred to as method 2) can be another IMTA technique to reduce the DL-UL interference and achieve performance gains in DL and UL packet throughput for the macro-pico co-channel scenario. In addition, using a reduced UL-DL adaptation set for pico cells (referred to as method 1) can reduce the DL-UL interference and achieve performance gains in DL and UL packet throughput for the macro-pico co-channel scenario. Offloading macro user traffic, muting macro subframes, and reducing the UL-DL adaptation set for pico cells can take into account inter-cell interference from macro cells, which inter-cell interference can prevent effective implementation of adaptive change of UL-DL configuration at pico cells.

Figure 6:
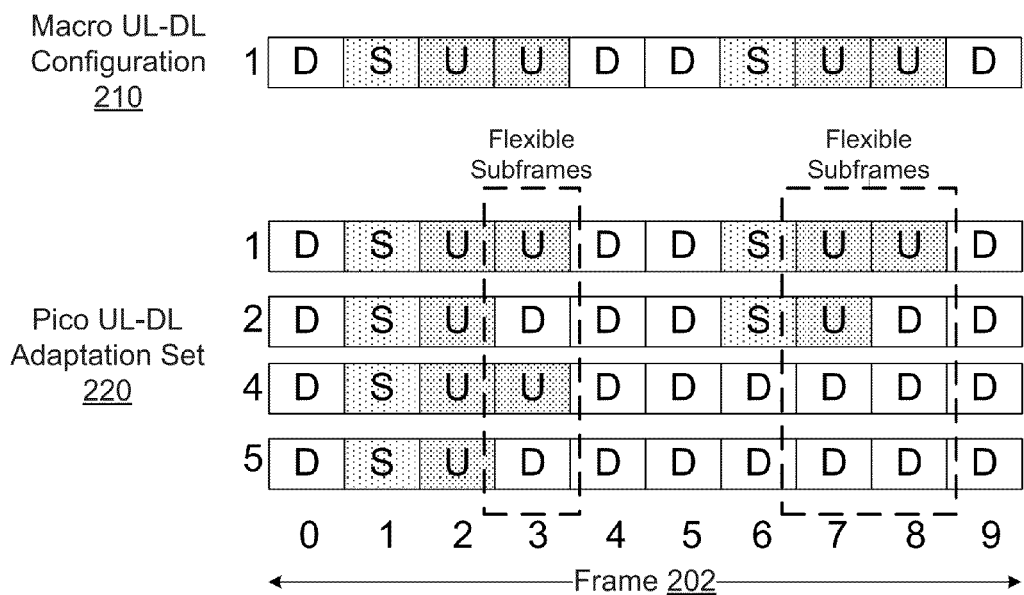
FIG. 6 illustrates a diagram of uplink-downlink (UL-DL) adaptation set for small cells in accordance with an example.

A reduced UL-DL adaptation set can be generated by applying subset constraint (i.e., method 1). For example, when macro cells operate in DL, the UL SINR of pico UEs can be negative even with low system loading, as shown in FIG. 2. An UL transmission can experience significant interference when macro stations (e.g., macro nodes) transmit DL signals. To avoid macro DL transmissions, a reduced set of UL-DL configurations can be applied at a pico cell. By applying such a constraint, the DL subframes of the macro cell can be a subset of pico cell DL subframes. For instance, each DL subframe of the macro cell can correspond to a DL or special subframe of the pico cell, and each UL subframe of the macro cell can correspond to a UL, DL, or special subframe of the pico cell. The DL subframe of pico cell can be a superset of the macro cell. FIG. 6 illustrates an example of a reduced UL-DL adaptation set of a pico cell based on a macro UL-DL configuration. If a macro cell use reference UL-DL configuration #1 (210) for radio frame 202, the pico cells may be allowed to use UL-DL configurations #1, 2, 4, 5 (220), where macro UL subframes (configured to change transmission directions in other UL-DL configuration [other than subframe 2 in legacy LTE]) can be configured as flexible subframes (FlexSF) for the pico cell. The FlexSF can be used for either the UL or DL transmission at the pico cell. In the example shown in FIG. 4 for macro UL-DL configuration #1, the FlexSF can include subframes 3, 7, and 8.

The reduced adaptation set can mitigate the DL-UL interference for UL SINR of the pico UEs. However, the UL traffic adaptation capabilities at pico stations may be reduced and performance gains in UL against reference UL-DL configuration #1 may not be substantial. Applying UL favored TDD configurations at the macro cells (e.g., TDD configuration 0 with 4:6 DL:UL ratio) can improve adaptation capabilities at a pico node, which can increase the size of the TDD configurations adaptation set at the pico cells. Using UL-DL configuration 0 allows the pico cell to use all seven legacy UL-DL configurations in the pico UL-DL adaptation set, in which case the pico UL-DL adaptation set is not reduced. In contrast, using UL-DL configuration 5 can restrict the pico cell to one legacy UL-DL configuration (e.g., UL-DL configuration 5) in the pico UL-DL adaptation set, which may not provide any advantage over a synchronous macro-pico UL-DL configuration. So the pico UL-DL adaptation set can range from one to seven legacy UL-DL configuration(s), when legacy UL-DL configurations are used.

The pico UL-DL adaptation set can be used to mitigate the impact of macro DL inter-cell interference on UL pico reception and also pico DL inter-cell interference on macro UL reception. The pico UL-DL adaptation set can provide a cross-cell interference coordination mechanism between macro and small cells (e.g., pico cells).

Macro user traffic offloading and/or macro subframe muting (i.e., method 2) can be used both to mitigate the impact of macro DL inter-cell interference on UL pico reception and to mitigate the impact of DL inter-cell interference from pico cells on macro UL performance. Main issues of macro-pico co-channel deployment scenario that can reduce the effectiveness of dynamic UL-DL reconfiguration at pico cells can include strong DL inter-cell interference from macro cells on pico cell UL transmissions (affecting PUEs) and strong DL inter-cell interference from pico cells on macro cell UL transmissions (affecting MUEs).

Strong DL inter-cell interference from macro cells can restrict the usage of pico cell UL transmission direction on DL subframes of macro cells. The strong DL inter-cell interference from macro cells can reduce improvements of UL packet throughput for pico cells when compared to reference UL-DL configuration.

Strong DL inter-cell interference from pico cells on macro cells can degrade UL performance of macro and pico UEs. CCIM can be used to mitigate performance degradation of pico UEs, but CCIM may not resolve a performance loss of macro UEs.

User offloading mechanisms, including offloading traffic from macro cells to pico cells, in combination with methods of muting DL macro subframes can be used to avoid or mitigate the DL-UL interference between macro and pico cells. Macro nodes serving the macro UEs can offload at least portion of the MUE traffic (e.g., a packet of the MUE) to pico cells, thus decreasing the load on the macro cell. The UL traffic and/or DL traffic can be offloaded from the macro node.

When the macro cells offload the macro UE uplink traffic to pico cells, little to no negative impact of DL inter-cell interference from the pico cells to the UL reception of the macro cells may occur since the UL traffic can be offloaded to the pico cells. For offloading of the macro UE uplink traffic, DL favored UL-DL configurations can be applied at the pico cells without encountering the performance loss at the macro cells, since at least a portion of the uplink traffic can be handled by the pico cells, so the macro cell has less uplink traffic.

Offloading of the macro UE downlink traffic from the macro cells to the pico cells can have various positive effects. For example, the pico cells can start applying the UL-favored UL-DL configurations that can increase UL packet throughput. For instance, the pico cells can use the DL subframes of the macro cells for UL transmission in the pico cells. Another benefit can be that offloading of the macro DL traffic can improve an overall interference environment in the network, which can also improve the DL throughput of the pico cell UEs. For instance, when macro DL traffic is offloaded, the DL subframes of macro cells can be considered as low interference (muted) subframes, so those subframes may not inject strong interference to the reception of traffic for the pico UEs.

Figure 7:
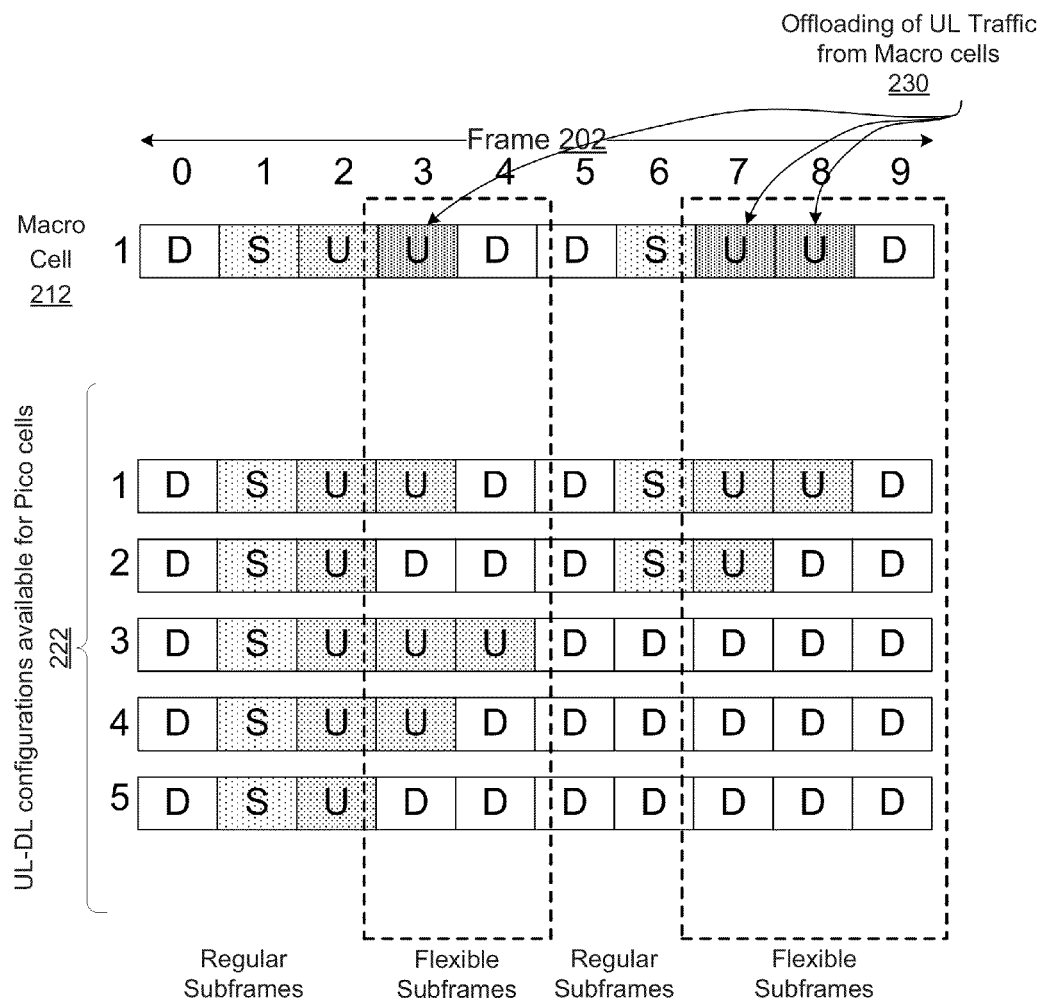
FIG. 7 illustrates a diagram of uplink (UL) traffic offloading to facilitate usage of downlink (DL) favored configurations at pico cells in accordance with an example.
Figure 8:
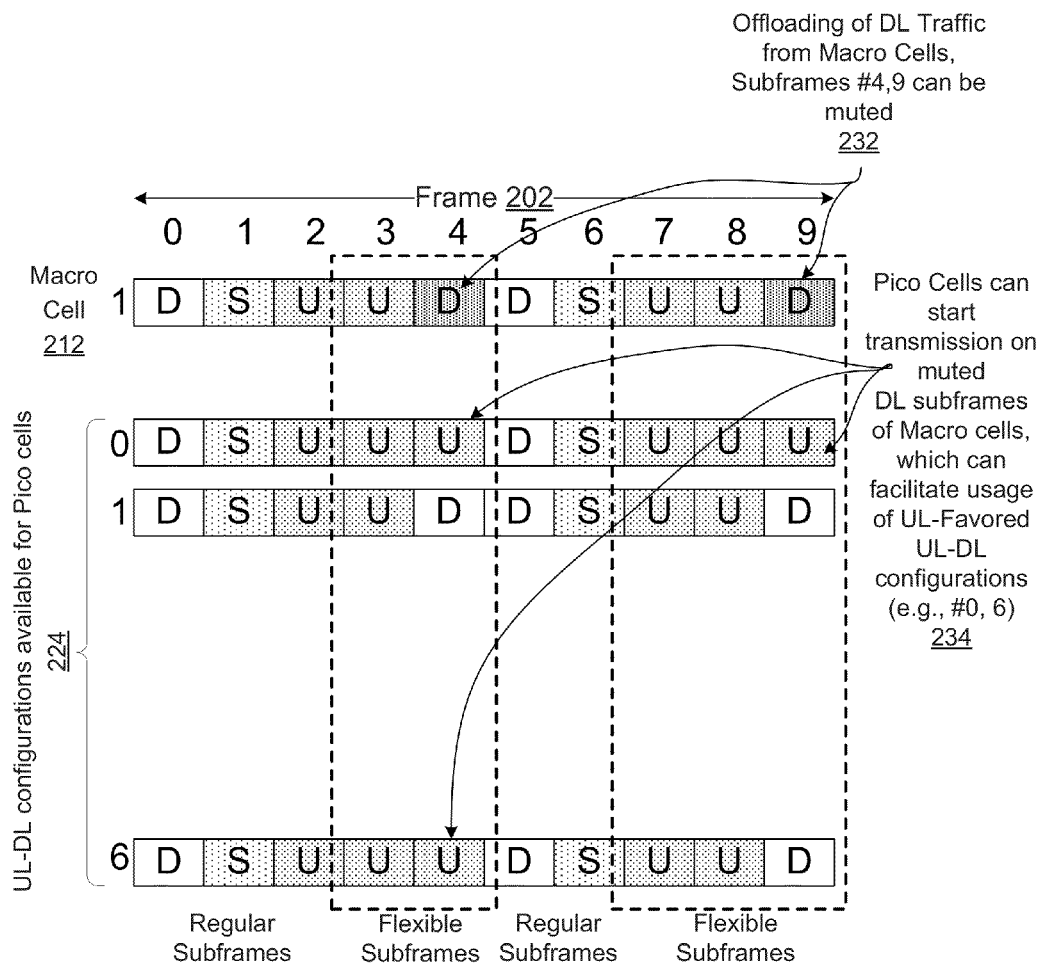
FIG. 8 illustrates a diagram of downlink (DL) traffic offloading and DL subframe muting to facilitate usage of uplink (UL) favored configurations at pico cells in accordance with an example.
Figure 9:
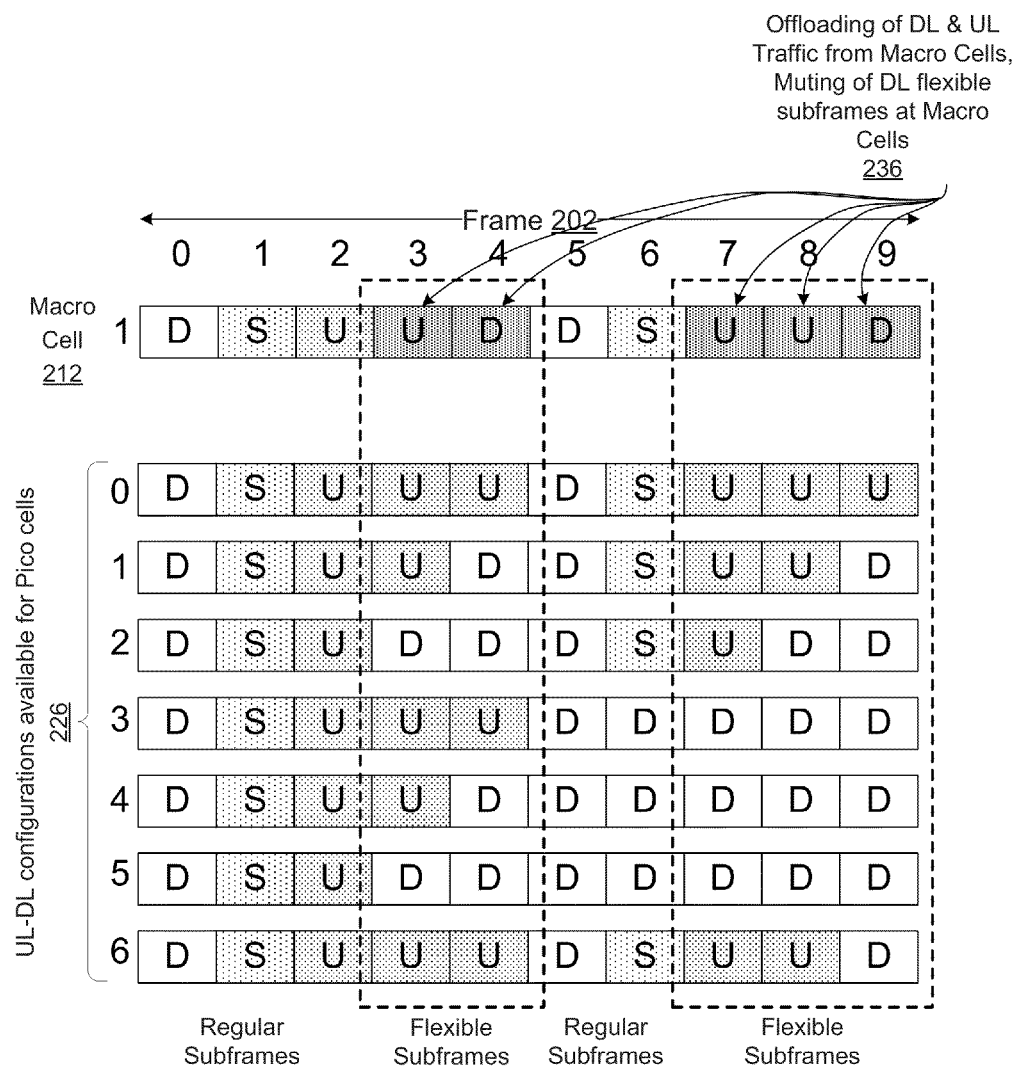
FIG. 9 illustrates a diagram of DL and UL traffic offloading and muting of downlink (DL) macro subframes for dynamic UL-DL reconfiguration at pico cells in accordance with an example.

Depending on implementation, the macro to pico traffic offloading may be applied for UL only, DL only or for both DL and UL traffic. FIG. 7 illustrates an example of offloading UL macro traffic. FIG. 8 illustrates an example of offloading DL macro traffic. FIG. 9 illustrates an example of offloading both UL and DL macro traffic. In the examples shown in FIGS. 7-9, a reference HetNet system can use a legacy UL-DL configuration #1 (212) in the macro cell and pico cells. In legacy LTE UL-DL configurations, subframes 3, 4, 7, 8, and 9 can be referred to as FlexSF, and fixed subframes 0, 1, 2, 5, and 6 can be referred to as regular subframes. FIGS. 7-9 can be compared to the pico cells use dynamic adaptation of UL-DL configurations (FIG. 6) while the macro cells apply UL-DL configuration #1.

In legacy LTE UL-DL configurations, since some of the macro cell and pico cell subframes are always aligned in terms of the transmission direction (i.e., D/S subframes 0, 1, 5, 6 and U subframe 2), the traffic offloading may be applied to a portion of DL and/or UL traffic while the macro cell may continue serving the remaining MUEs in regular subframes with the fixed transmission direction. Advanced UL-DL configuration may not have a constraint on subframes with the fixed transmission direction. The offloading of the macro DL and/or UL traffic may allow additional traffic to be offloaded.

In FIG. 7, the UL traffic can be offloaded from macro cells to pico cells 230. As a result, the subframes #3, 7 and 8 can be freed up and used for the DL transmission at the pico cells without affecting uplink performance of the macro UEs. The usage of the DL-favored UL-DL configurations (e.g., UL-DL configurations 2, 3, 4, or 5) from the available UL-DL configurations 222 (e.g., UL-DL configurations 1, 2, 3, 4, or 5) can substantially improve the DL packet throughput of pico UEs due to more flexible traffic adaptation capabilities at the pico cells. At the same time, the macro UE can still serve some of the UL traffic in a remaining UL subframe #2 (using a legacy LTE UL-DL configuration). In another example, pico cells can use the DL-favored UL-DL configurations and apply CCIM or other interference mitigation methods to avoid DL-UL interference problem on pico links.

FIG. 8 shows an opposite example when only DL macro traffic is offloaded from the macro cells 232 to pico cells. For this example, the macro cells can restrict or mute their DL transmissions on flexible subframes #4 and 9. FlexSF 4 and 9 can be considered as low interference subframes (or almost blank subframes [ABS]). The reduction of the DL inter-cell interference from the macro cells on those subframes 4 and 9 can facilitate the usage of UL favored UL-DL configurations #0 and 6 (234) from the available UL-DL configurations 224 (e.g., UL-DL configurations 0, 1, or 6), and thus substantially improve UL packet throughput at the pico cells. In addition, the DL throughput of the pico UEs can also be improved since the pico DL subframes 4 and 9 may not be limited by macro cell interference. In DL subframes 0, 1, 5, and 6 (using a legacy LTE UL-DL configuration), the macro UE can still serve some of the DL traffic which was not offloaded.

FIG. 9 illustrates a case when both DL and UL traffic is offloaded from macro cells 236 to pico cells. The whole set of UL-DL configurations 226 can be used for traffic adaptation at pico cells providing additional flexibility in terms of traffic adaptation. The DL-UL interference on pico-pico links can be resolved by using isolated CCIM or other interference mitigation techniques. In an example, the pico cells can use the whole set of UL-DL configurations and apply CCIM or other interference mitigation methods to avoid or reduce DL-UL interference.

FIGS. 7-9 provide examples of macro traffic offloading and do not limit the scope of the invention. Traffic and/or user offloading can be used to extract benefits from dynamic UL-DL configurations and can be further extended to other UL-DL configurations, such as advanced UL-DL configurations. In a general case, traffic can be offloaded from both flexible and regular subframes of the radio frame and also applied for other UL-DL configurations used at macro cells. Alternatively, in an extreme case, all macro users can be offloaded to pico cells. If all MUEs are offloaded to pico cells, the macro cell transmissions can be muted (at least in terms of data transmissions) and thus the DL-UL inter-cell interference (impact of pico DL on macro UL and macro DL on pico UL) can be reduced significantly or almost avoided. In another example, the macro cells can continue serving some of the macro UEs (e.g. closely located UEs or farther away from the pico cells) in regular subframes of the radio frame.

In another example, a hybrid scheme (i.e., method 3) can include using a combination of an UL-DL adaptation set at the pico cell (i.e., method 1) and macro user traffic offloading and/or macro subframe muting (i.e., method 2) by joint optimization. The combination of a reduced UL-DL adaptation set method and traffic offloading can be used to further increase the benefits of UL-DL reconfiguration at pico cells. For example, the macro cell can attempt to offload the DL and/or UL heavy MUEs to the pico cell using method 2. As the DL traffic increases, at some point the small cell (e.g., pico cell) can adopt the DL/UL configuration to increase the DL subframe allocation based on a subset constraint proposed by method 1 (e.g., UL-DL configuration 1 can switch to UL-DL configuration 2 (see FIG. 6)). The modification of the UL-DL configuration of the UL-DL adaptation set can be iteratively optimized to adjust to the time varying traffic conditions of the network. As traffic or other condition change (e.g., loading or coverage) some UE can switch back to the macro cell from the small cell (e.g., UL heavy UE due to the limited UL capacity in small cell or moving out of range of the small cell). When some UE switch back to the macro cell or when a UL/DL traffic pattern of a small cell changes, the small cell (e.g., pico cell) can adopt a UL-DL configuration to decrease the DL subframe allocation based on the subset constraint of method 1 (e.g., UL-DL configuration 2 can switch to UL-DL configuration).

In another example, a hybrid scheme (i.e., method 4) can include using a combination of method 1, 2, and/or 3, and a CCIM method. The combination of the CCIM method and the method(s) 1, 2, and/or 3 can be applied to improve the performance. For example, when the macro-pico interference is mitigated or avoided using the method(s) 1, 2, and/or 3, the pico-pico interference may still exist. Additionally, applying cell clustering approach (e.g., CCIM method, which can divide the set of small cells (e.g. pico cells) into cell clusters according to some metric (e.g., inter-cell coupling loss)) can mitigate the pico-pico interference. The isolated cell clusters can be allowed to independently adapt their TDD configurations based on the instantaneous traffic conditions. So, each the cells inside one isolated cell cluster can use a same TDD configuration and ensure a same transmission direction, thus avoiding a negative impact of BS-BS interference inside the cluster. Meanwhile, other neighboring clusters can use different TDD configurations that may be adapted according to their respective traffic conditions.

Figure 10:
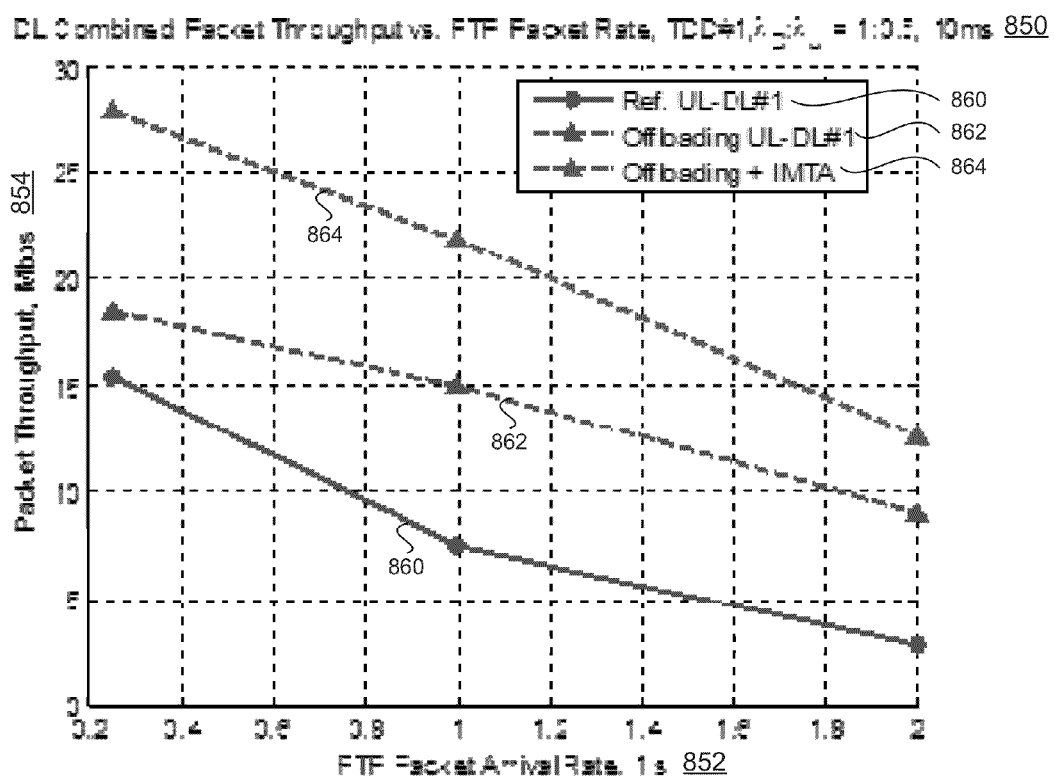
FIG. 10 illustrates a file transfer protocol (FTP) packet arrival rate and downlink (DL) packet throughput comparison using traffic offloading from macro cells to small cells and interference management and traffic adaptation (IMTA) among pico cells in accordance with an example.
Figure 11:
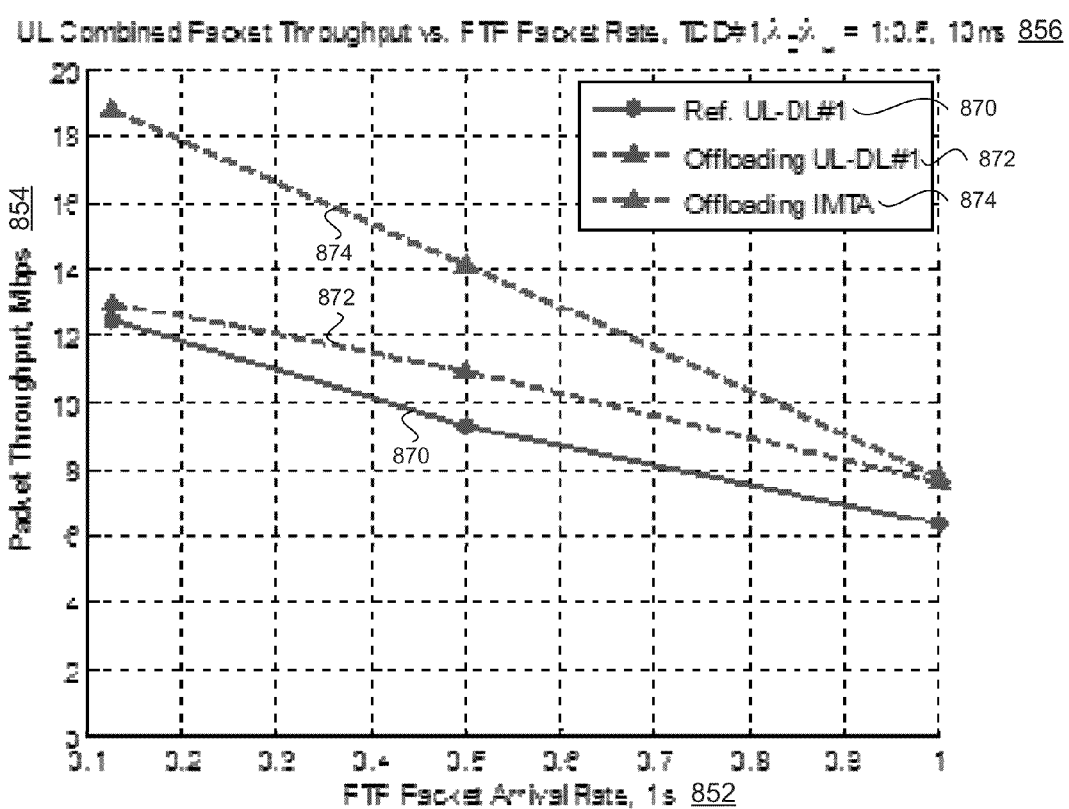
FIG. 11 illustrates a file transfer protocol (FTP) packet arrival rate and uplink (UL) packet throughput comparison using traffic offloading from macro cells to small cells and interference management and traffic adaptation (IMTA) among pico cells in accordance with an example.

FIGS. 10 and 11 illustrate downlink (DL) and uplink (UL) packet throughput 854 (measured in Megabits per second (Mbps)) comparison and performance analysis relative to a file transfer protocol (FTP) packet arrival rate 852 (measured in 1/seconds (1/s) or Hertz (Hz)). FIGS. 10 and 11 illustrate the benefits of UL-DL reconfigurations for method(s) 1, 2, 3, and/or 4, including user offloading from macro to pico cells. The simulation examples consider an idealistic case when all macro users are offloaded to pico cells during FlexSF. To take into account an increase of the amount of traffic at pico cells due to macro user offloading, the macro cell traffic is shared among four pico cells deployed in a macro cell sector. To emulate the effect of the increased amount of traffic at pico cells, the packet arrival rate at pico cells is increased by 25%. The FTP packets are randomly distributed among the pico cell UEs (e.g., pico UEs and macro UEs offloaded from macro cells). FIG. 10 illustrates the analysis of DL cell average packet throughput 850, and FIG. 11 illustrates the analysis of UL cell average packet throughput 856. Three cases are considered: Macro-pico co-channel case when all cells use reference UL-DL configuration #1 (i.e., Ref. UL-DL#1) 860 (FIG. 10) and 870 (FIG. 11); macro-pico co-channel case when all macro UEs are offloaded to pico cells and all pico cells use reference UL-DL configuration #1 (i.e., Offloading UL-DL#1) 862 (FIG. 10) and 872 (FIG. 11); macro-pico co-channel case when all macro UEs are offloaded to pico cells and pico cells apply seven UL-DL configurations for traffic adaptation at pico cells and IMTA isolated cell clustering method to mitigate DL-UL interference (Offloading+IMTA, or method 4) 864 (FIG. 10) and 874 (FIG. 11).

Some technical benefits of offloading, using an UL-DL adaption set, and/or implementing IMTA can be observed from the example of the DL and UL cell average packet throughputs illustrated by FIGS. 10 and 11. Offloading of macro UEs to pico cells can provide a substantial improvement of the DL inter-cell interference environment since macro DL subframes can be converted into low interference subframes (or almost blank subframes [ABS]). In addition, traffic adaptation capabilities at pico cells can be reduced due to slightly increased amount of traffic in pico cells, but the pico cells can start using the UL-favored or DL-favored configuration that can substantially improves traffic adaptation capabilities, which can generate an overall improvement of traffic adaptation capabilities. The offloading of macro UEs to pico cells 862 and 872 even without traffic adaptation can enable better DL and UL packet throughput performance compared to the reference case 860 and 870. The dynamic adaptation of UL-DL configurations at pico cells in combination with isolated cell clustering interference mitigation (CCIM) method 864 and 874 can further improve DL and UL packet throughput performance. As shown by the examples of FIGS. 10 and 11, when macro UEs are offloaded to pico cells, the dynamic UL-DL configuration can be beneficial even for a challenging macro-pico co-channel scenario. When efficient macro user offloading mechanisms (e.g., method 2) are utilized in combination with interference management and traffic adaptation (e.g., method 4) at pico cells, a significant improvement in terms of UL and DL packet throughputs can be achieved.

Macro UE, user, and/or traffic offloading can be implemented in a semi-static or dynamic way. For a semi-static approach, an LTE mechanism such as enhanced inter-cell interference coordination (eICIC), high interference indication (HII), or overload indication (OI) can be applied. For example, the eICIC mechanisms with large RSRP bias can be used to offload users from macro cells to pico cells. For instance, depending of the reference UL-DL configuration in the macro cell, the macro nodes can coordinate an "ABS info pattern" among macro cells and apply the ABS info pattern for the HetNet. In addition the overload indication (O) or high interference indication (HII) mechanisms can be reused jointly with a cell admission control mechanism. In addition, the macro cell can configure some of the DL subframes as multicast\broadcast single-frequency network (MBSFN) subframes to minimize the interference from macro cells in the network.

A network can support frequency domain inter-cell interference coordination (ICIC) or time domain enhanced ICIC (eICIC). In an example, ICIC can be used to decrease interference between neighboring cells or nodes (e.g., coordination nodes or cooperation nodes) by lowering the power of a part of the subchannels in the frequency domain which then can be received close to the node. The subchannels do not interfere with the same subchannels used in neighboring cells and thus, data can be sent to mobile devices with less interference on the subchannels close to the cell.

Enhanced ICIC (eICIC) can be used in the time domain for heterogeneous networks (HetNets), where a high power macro cell can be complemented with low power nodes such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of subframes in the time domain in the macro cell.

Dynamic offloading can be performed depending on instantaneous traffic conditions in the network cells. The dynamic mechanisms can include cooperative processing among the macro cell and a plurality of pico cells. For instance, a user (e.g., MUE) in communication with the macro cell can monitor a link quality with the neighboring pico cells. The UE can measure a channel quality for different interference environments (e.g., regular or ABS subframes) and report a corresponding channel quality indicator (CQI) feedback for both macro and pico cells. Based on the channel quality feedback information (e.g., CQI) and traffic conditions, the macro cell (or central processing unit (CPU) or central processing module (CPM)) can determine whether the user traffic can be offloaded to the pico cells or not. The CPU or CPM can be used as a baseband unit (BBU) for multiple node (e.g., eNBs) of the network (e.g., HetNet), such as in a centralized, cooperative, or cloud radio access network (C-RAN or CRAN). The dynamic approach can be implemented with CRAN architecture where processing of several cells can be performed by one CPU or CPM. In CRAN, the node functionality can be subdivided between a baseband unit (BBU) processing pool and a remote radio unit (RRU) or a remote radio head (RRH) with optical fiber connecting the BBU to the RRU. The C-RAN can provide centralized processing, co-operative radio, and real-time cloud infrastructure RAN. In an example, a dynamic point selection (DPS) approach can be applied and user (e.g., UE) can be configured to receive data from other cell. Dynamic point selection (DPS) allows dynamic offloading of traffic from the macro node to a LPN in a coordination set (e.g., Coordinated MultiPoint (CoMP) cluster). The traffic offloading in DPS can be achieved by adaptive re-selection of a serving point (e.g., from a macro node to a LPN) and applying resource blanking (e.g., on macro node) to suppress interference. DPS can be a dynamic extension of the semi-static cell range expansion (CRE) process and a time domain eICIC process. The scheduling for DPS can be conducted in centralized manner simultaneously for the macro node and the LPNs within one coordination set (e.g., CoMP cluster). In another example, the macro and pico cells can exchange the information on the UE DL/UL channel quality (e.g., CQI) in different interference environments (e.g. regular or muted ABS subframes) as well as current traffic buffer states to estimate the potential performance benefits and to make determinations on traffic offloading.

The combination of macro user offloading with isolated cell clustering (e.g., CCIM) of pico cells can represent a combination that enables dynamic adjustment of UL-DL configuration at the pico cells. Methods 1-4 can substantially increase the DL and UL packet throughput for both macro and pico UEs in a DL-UL interference macro-pico co-channel deployment scenario. The UE offloading from the macro cells can substantially improve the DL inter-cell interference environment and extend dynamic traffic adaptation capabilities at the pico cells (e.g., UL favored configuration can be applied at the pico cells even if the macro cells are configured to use DL favored configurations). In new carrier types, the usage of user offloading and macro cell muting can be even more beneficial since the muted subframes can have a lower density of cell reference signals (CRS). For instance, CRSs can be transmitted with 5 millisecond (ms) periodicity and can be potentially allocated to regular subframes or just a few subframes per frame. In some cases, the DL subframes from macro cells can be considered as completely muted.

Figure 12:
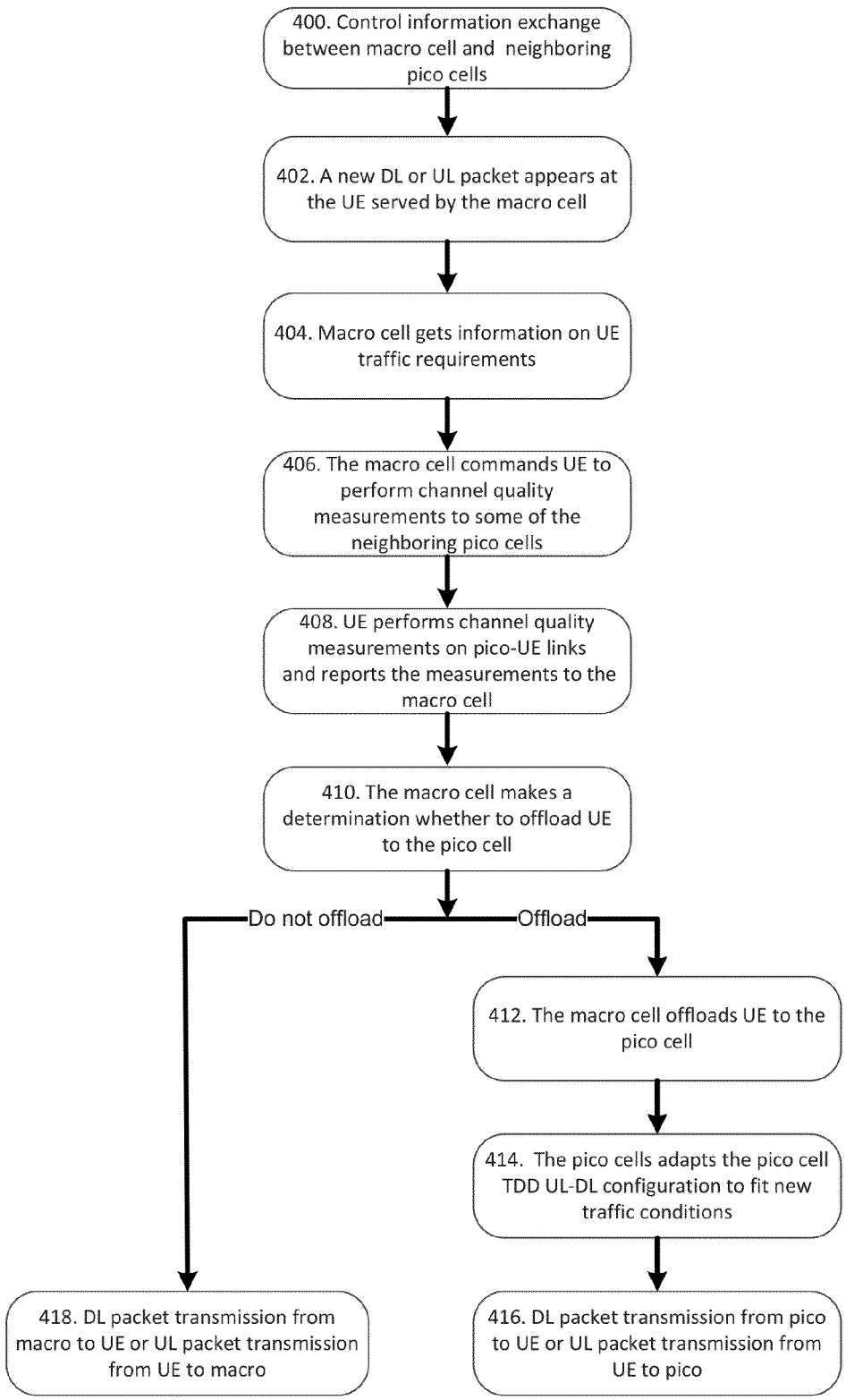
FIG. 12 illustrates a functional block diagram of macro user equipment (MUE) traffic offloading from macro cells to small cells in accordance with an example.

FIG. 12 illustrates a functional block diagram for dynamic traffic offloading from the macro cell to the pico cell. Control information can be exchanged between the macro cell and neighboring pico cells 400. The macro cell can exchange control information with the neighboring pico cells to acquire information to make a determination on an efficiency of using traffic offloading. The control information can include: A current DL and UL buffer status of the pico cells; DL/UL cell spectral efficiency (SE) of the pico cells on regular and/or flexible subframes (FlexSF); pico cell capabilities to adapt TDD UL-DL configurations (e.g., current UL-DL configuration, UL-DL configuration adaptation set, or TDD configuration adaptation time scale); inter-cell path gains (between the macro cell and pico cells); or possibility to accept offloaded UEs (e.g., pico cell may indicate such possibility) if the pico cell is not overloaded. The information exchange can be done with some periodicity (e.g., 10 ms or 50 ms). The information exchange can be performed via X2 signaling or using centralized entity which gathers the information.

A new DL or UL packet can appear at the UE served by the macro cell 402. The macro cell can get information on UE traffic requirements 404 (e.g., amount of data and/or a quality of service (QoS) parameter). The macro cell can command the UE to perform channel quality measurements to some of the neighboring pico cells, or remote radio heads (RRHs) 406. The channel quality measurements can be obtained, if the macro cell does not have updated measurements. The channel quality measurements can be obtained in advance and the macro cell may be aware of the channel quality before the user packet arrives. The UE can perform channel quality measurements on the pico-UE links and report the measurements to the macro cell 408. The macro cell can make a determination whether to offload the UE to the pico cell 410. Multiple criteria can be used to make the determination. For instance, the potential gain in the UE packet throughput can be estimated to make the determination.

If the macro cell makes the determination to offload the UE to the pico cell, the macro cell offloads the UE to the pico cell 412. The pico cells can adapt the pico cell TDD UL-DL configuration to fit new traffic conditions, taking into account the traffic and UL-DL configuration used in the macro cell 414. In an example, the pico cell TDD UL-DL configuration can be adapted in accordance with the TDD configuration adaptation time scale. The DL packet can be transmitted from the pico cell to the UE or the UL packet can be transmitted from the UE to the pico cell 416.

If the UE is not offloaded to the pico cell, the DL packet can be transmitted from the macro cell to the UE or the UL packet can be transmitted from the UE to the macro cell 418 (e.g. using regular subframe). During the transmission (e.g., steps 416 or 418) the network (e.g., macro cell, pico cell, CPU, and/or CMU) can revise the decision and return the UE to the macro cell or offload another UE.

A similar procedure may be applied to transfer traffic from one pico cell to another pico cell to enable a more efficient traffic adaptation. For example, transferring traffic between pico cells can be beneficial when one of the pico cells is loaded and another has both DL and/or UL traffic.

Figure 13:
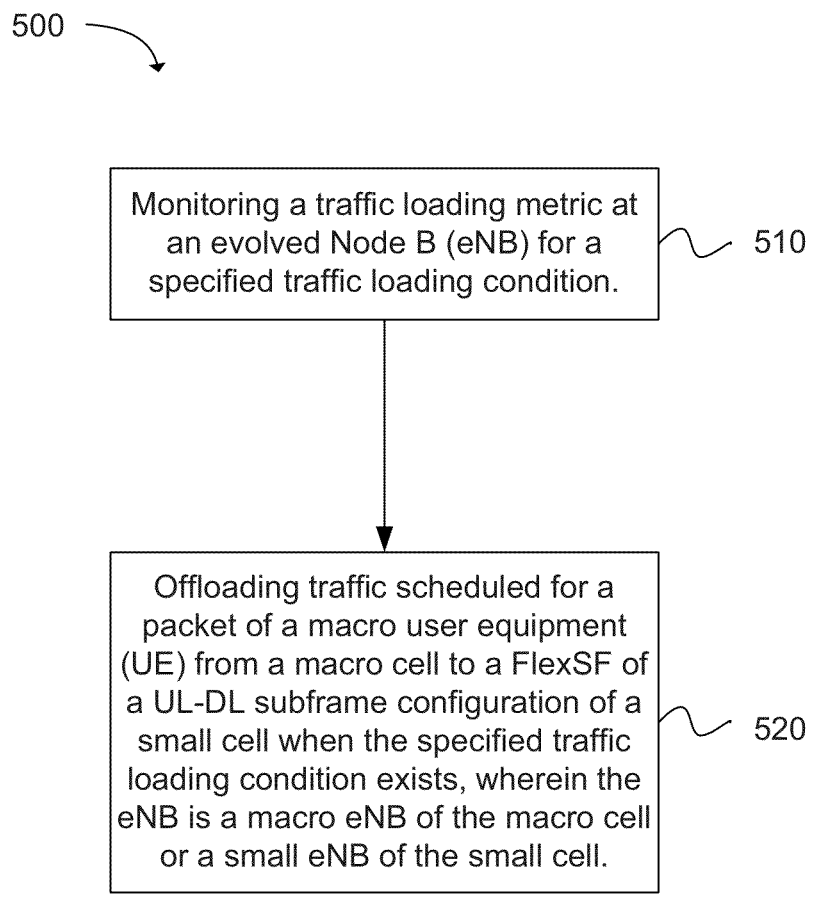
FIG. 13 depicts a flow chart of a method for traffic offloading to generate a low interference flexible subframe (FlexSF)

Another example provides a method 500 for traffic offloading to generate a low interference flexible subframe (FlexSF) of an adaptive uplink-downlink (UL-DL) time-division duplexing (TDD) subframe configuration in a heterogeneous network (HetNet), as shown in the flow chart in FIG. 13. The method may be executed as instructions on a machine, where the instructions are included on at least one computer readable medium or one non-transitory machine readable storage medium. The method includes the operation of monitoring a traffic loading metric at an evolved Node B (eNB) for a specified traffic loading condition, as in block 510. The operation of offloading traffic scheduled for a packet of a macro user equipment (UE) from a macro cell to a FlexSF of a UL-DL subframe configuration of a small cell when the specified traffic loading condition exists, wherein the eNB is a macro eNB of the macro cell or a small eNB of the small cell follows, as in block 520. The specified traffic loading condition can be determined from control information including a current downlink (DL) or uplink (UL) buffer status of the macro cell or the small cell, a DL or UL cell spectral efficiency of the small cell or the macro cell on subframes, a small cell capability to adapt UL-DL TDD configurations, an inter-cell path gain between the macro cell and the small cell, or a small cell capability to accept additional UEs. The FlexSF can include subframe 3, 4, 7, 8, or 9 (e.g., for legacy LTE UL-DL configurations), or a subframe configured to allow opposite transmission directions (e.g., for UL-DL configurations for other carrier types). The small eNB can include a low power node (LPN), a micro eNB, a pico eNB, a femto-eNB, a home eNB (HeNB), a remote radio head (RRH), a remote radio equipment (RRE), or a remote radio unit (RRU).

In a configuration, the operation of offloading the traffic of the macro cell can further include offloading uplink (UL) traffic when additional downlink (DL) subframes are requested by the small cell. In another configuration, the operation of offloading the traffic of the macro cell can further include offloading downlink (DL) traffic when additional uplink (UL) subframes are requested by the small cell.

In an example, the method can further include muting data transmission of a DL subframe scheduled at a substantially similar time as a flexible subframe (FlexSF) of the small cell. The muted data transmission can use a regular subframe or a pre-configured almost blank subframe (ABS). In another example, the method can further include adapting the FlexSF of the UL-DL subframe configuration of the small cell to the UL-DL subframe configuration of the macro cell in a reduced UL-DL adaption set. The FlexSF of the small cell can be scheduled at a substantially similar time as an uplink (UL)

subframe of the macro cell, and the FlexSF can be configured to vary as a DL subframe or an UL subframe based on the reduced UL-DL adaption set.

In another configuration, the method can further include: Measuring node-to-node channel interference between small cells estimated from an uplink (UL) subframe of one small cell during a downlink (DL) subframe of another small cell; collecting node-to-node channel interference measurements at the small cell from at least one another small cell; determining interference management (IM) clusters based on the collected node-to-node channel interference measurements from small cells; and configuring the small cells in each IM cluster with a same UL-DL subframe configuration. The small cells generating interference on each other above a specified threshold can be grouped together in a same IM cluster or divided into isolated sub-clusters based on traffic conditions and transmission direction.

In another example, the method can further include reducing a transmission power at the small eNB on the FlexSF configured as the DL subframe. In another configuration, the method can further include, prior to offloading the traffic of the macro cell: Receiving, at the macro eNB, macro UE (MUE) traffic requirements including an amount of data to be transmitted or a quality of service (QoS) parameter for the packet; requesting channel quality measurements from the MUE for neighboring small cells; receiving channel quality measurements at the macro eNB from the MUE for the neighboring small cells; and determining the traffic of the macro cell to offload based on at least one of the MUE traffic requirements and the channel quality measurements from the MUE on the neighboring small cells.

FIG. 14 illustrates example nodes and an example user equipment (UE) 720 in a heterogeneous network (HetNet). The nodes can include a macro node 710 (e.g., macro-eNB) or a low power node 730 (e.g., small node, small eNB, micro-eNB, a pico-eNB, a femto-eNB, a home eNB (HeNB), a remote radio head (RRH), a remote radio equipment (RRE), or a remote radio unit (RRU)). The macro node can be configured to communicate with the LPN via a backhaul link 750. The nodes can include a node device 712 and 732. The node device of the macro node can be configured to semi statically select an uplink-downlink (UL-DL) time-division duplexing (TDD) subframe configuration in a heterogeneous network (HetNet) to allow traffic adaption at a small cell. The node device 712 of the macro node can include a processing module 714 and a transceiver module 716. The processing module can be configured to determine traffic of the macro node to offload to a small node and to modify a macro UL-DL configuration to reduce the number of uplink subframes or downlink subframes. The offloaded traffic can include a transmission of a macro user equipment (MUE) packet. The transceiver module can be configured to: Communicate with a MUE (e.g., UE 720), communicate the modified macro UL-DL configuration to the small node, and communicate offloaded traffic to the small node.

In an example, the processing module 714 can be further operable to offload uplink (UL) traffic to the small node when a determination is made to increase a number of downlink (DL) subframes in the HetNet, or the processing module can be further operable to offload DL traffic to the small node when a determination is made to increase a number of UL subframes in the HetNet. In another example, the processing module can be further configured to monitor a specified traffic loading condition to trigger offloading of the traffic of the MUE to the small node, trigger muting a data transmission of a downlink (DL) subframe scheduled at a substantially similar time as a flexible subframe (FlexSF) of the small cell, trigger a request to the small node to use a UL-DL adaption set, trigger a request to the small node to perform cell clustering interference mitigation (CCIM), or trigger a request to the small node to reduce a transmission power on a FlexSF configured as the DL subframe at the small node.

In an example, the transceiver module 716 can be further configured to mute a data transmission of a DL subframe scheduled at a substantially similar time as a flexible subframe (FlexSF) of the small cell. The muted data transmission can use a regular subframe or an almost blank subframe (ABS). The FlexSF can include subframe 3, 4, 7, 8, or 9 (e.g., for legacy LTE UL-DL configurations), or a subframe configured to allow opposite transmission directions (e.g., for advanced UL-DL configurations). In another example, the transceiver module can be further configured to communicate with the small nodes 730 via X2 signaling or backhaul link 750 signaling via a wireless channel 752, wired connection or an optical fiber connection. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM). The small node 730 can include a low power node (LPN), a micro eNB, a pico eNB, a femto-eNB, a home eNB (HeNB), a remote radio head (RRH), a remote radio equipment (RRE), or a remote radio unit (RRU).

In another example, the transceiver module 716 can be further configured to: Receive MUE traffic requirements, request channel quality measurements from the MUE (e.g., UE 720) on neighboring small cells, and receive channel quality measurements of neighboring small cells from the MUE. The processing module can be further configured to determine the traffic to offload based on at least one of the channel quality measurements of neighboring small cells and MUE traffic requirements. The MUE traffic requirements can include an amount of data to be transmitted or a quality of service (QoS) parameter for the MUE packet.

In another configuration, the processing module can be further configured to offload the traffic to the small node using a semi-static mechanism or dynamic signaling. The semi-static mechanism can use enhanced inter-cell interference coordination (eICIC) with a large reference signal received power (RSRP) bias, overload indication (OI), or high interference indication (HII). The dynamic signaling can include physical or higher layer signaling indicating the offloading of the transmission.

The node device 732 of the small node 730 (e.g., a small evolved Node B (eNB)) can be configured to adapt uplink-downlink (UL-DL) time-division duplexing (TDD) subframe configurations in a heterogeneous network (HetNet). The node device of the small node can include a processing module 734 and a transceiver module 736. The transceiver module can be configured to receive a macro UL-DL configuration from a macro eNB. The processing module can be configured to generate a pico UL-DL adaption set based on the macro UL-DL configuration. The pico UL-DL adaption set can include a subset of available UL-DL configurations with a flexible subframe (FlexSF). The FlexSF can be configured to vary as one of a downlink (DL) subframe or an UL subframe based on the pico UL-DL adaption set. In an example, each pico FlexSF of pico UL-DL adaption set is scheduled at a substantially similar time as a macro uplink (UL) subframe of the macro UL-DL configuration.

In an example, transceiver module 736 can be further configured to communicate with a macro user equipment (MUE) when traffic from the macro eNB is offloaded. The transceiver module can be further operable to receive UL traffic from the MUE to increase a DL packet throughput in the HetNet, or the transceiver module can be further operable to transmit the DL traffic to the MUE to increase a UL packet throughput in the HetNet. The transceiver module can be further configured to reduce a transmission power on traffic of the FlexSF configured as the DL subframe. The FlexSF can include subframe 3, 4, 7, 8, or 9 (e.g., for legacy LTE UL-DL configurations), or a subframe configured to allow opposite transmission directions (e.g., for advanced UL-DL configurations).

In another example, the node device 732 can be further configured to use cell clustering interference mitigation (CCIM). The transceiver module 736 can be further configured to measure node-to-node channel interference between small cells, communicate with at least one other small eNB, and collect node-to-node channel interference measurements from the at least one other small eNB. The processing module 734 can be further operable to determine interference mitigation (IM) cell clusters based on the collected node-to-node channel interference measurements from small cells and configure the small cells in each IM cell cluster with a same UL-DL subframe configuration. The small cells generating interference on each other above a specified threshold can be grouped together in a same IM cluster, and the specified threshold can be based on inter-cell coupling loss or an estimated node-to-node pathloss. In an example, the transceiver module can be further configured to communicate with the macro eNB 710 and other small eNBs via X2 signaling or backhaul link 750 signaling via a wireless channel 752, wired connection or an optical fiber connection.

The UE 720 (e.g., wireless device) can include a transceiver module 724 and a processing module 722. The UE can be configured to communicate with the macro node and small node, which communication can include a MUE packet. The transceiver module and the processing module can be used to receive, send, and/or process the MUE packet.

FIG. 15 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of a macro evolved node B (eNB) for traffic offloading to generate one or more low interference flexible subframes (FlexSFs) of an adaptive uplink-downlink (UL-DL) time-division duplexing (TDD) subframe configuration in a heterogeneous network (HetNet), comprising:
   monitoring a traffic loading metric at the macro eNB of the HetNet or through at least one of a plurality of neighboring small eNBs of the HetNet for a specified traffic loading condition based on respective UL-DL subframe configuration information exchanged between the macro eNB and the plurality of neighboring small eNBs;
   determining that the specified traffic loading condition exists;
   offloading, in response to said determining, traffic scheduled for a macro user equipment (UE) from one or more macro subframes of a UL-DL subframe configuration of the macro eNB to one or more FlexSFs of a plurality of independent UL-DL subframe configurations of the plurality of neighboring small eNBs to avoid or mitigate a DL-UL interference between the macro eNB and the plurality of neighboring small eNBs;
   wherein the one or more macro subframes are muted and the one or more macro subframes are at subframe positions of the UL-DL subframe configuration of the macro eNB that are equal to corresponding subframe positions of the one or more FlexSFs in the plurality of independent UL-DL subframe configurations of the neighboring small eNBs, and
   wherein the one or more macro subframes and the corresponding one or more FlexSFs are downlink subframes when the traffic scheduled is downlink traffic and uplink subframes when the traffic scheduled is uplink traffic.

2. The method of claim 1, wherein the specified traffic loading condition is determined from control information selected from the group consisting of a current downlink (DL) or uplink (UL) buffer status of a macro cell of the macro eNB or a small cell of one or more of the plurality of neighboring small eNBs, a DL or UL cell spectral efficiency of a small cell of one or more of the plurality of neighboring small eNBs or a macro cell of the macro eNB on subframes, a small cell capability of one or more of the plurality of neighboring small eNBs to adapt UL-DL TDD configurations, an inter-cell path gain between a macro cell of the macro eNB and a small cell of one or more of the plurality of neighboring small eNBs, a small cell capability of one or more of the plurality of neighboring small eNBs to accept additional UEs, and combinations thereof.

3. The method of claim 1, wherein the one or more FlexSFs are selected from the group consisting of subframe 3, 4, 7, 8, 9, and a subframe configured to allow opposite transmission directions; and the plurality of small eNBs include a low power node (LPN), a micro eNB, a pico eNB, a femto-eNB, a home eNB (HeNB), a remote radio head (RRH), a remote radio equipment (RRE), or a remote radio unit (RRU).

4. The method of claim 1, wherein offloading the traffic of a macro cell of the macro eNB further comprises offloading uplink (UL) traffic when additional downlink (DL) subframes are requested by a small cell of one or more of the plurality of neighboring small eNBs.

5. The method of claim 1, wherein offloading the traffic of a macro cell of the macro eNB further comprises offloading downlink (DL) traffic when additional uplink (UL) subframes are requested by a small cell of one or more of the plurality of neighboring small eNBs.

6. The method of claim 5,
   wherein the muted data transmission uses a regular subframe or a pre-configured almost blank subframe (ABS).

7. The method of claim 1, further comprising:
   adapting the one or more FlexSFs to the UL-DL subframe configuration of the macro eNB in a reduced UL-DL adaption set, wherein the one or more FlexSFs are configured to vary as a DL subframe or an UL subframe based on the reduced UL-DL adaption set.

8. The method of claim 1, further comprising:
   measuring node-to-node channel interference between small cells of one or more of the plurality neighboring small eNBs estimated from an uplink (UL) subframe of one small cell during a downlink (DL) subframe of another small cell;
   collecting node-to-node channel interference measurements at one or more of the small cells of the plurality of neighboring small eNBs from at least another small cell;
   determining interference management (IM) clusters based on the collected node-to-node channel interference measurements from small cells, wherein the small cells generating interference on each other above a specified threshold are grouped together in a same IM cluster; and
   configuring the small cells in each IM cluster with a same UL-DL subframe configuration.

9. The method of claim 1, further comprising:
reducing a transmission power at the one or more neighboring small eNBs of the plurality of neighboring small eNBs on the respective FlexSF configured as the DL subframe.

10. The method of claim 1, further comprising, prior to offloading the traffic of a macro cell of the macro eNB:
receiving, at the macro eNB, macro UE (MUE) traffic requirements including an amount of data to be transmitted or a quality of service (QoS) parameter for the packet;
requesting channel quality measurements from the MUE for small cells of the plurality of neighboring small eNBs;
receiving channel quality measurements at the macro eNB from the MUE for the small cells; and
determining the traffic of the macro cell to offload based on at least one of the MUE traffic requirements and the channel quality measurements from the MUE on the small cells.

11. At least one non-transitory machine readable storage medium comprising a plurality of instructions adapted to be executed to implement the method of claim 1.

12. A node device of a macro eNB configured to select an uplink-downlink (UL-DL) time-division duplexing (TDD) subframe configuration in a heterogeneous network (HetNet) to allow traffic adaption at a small eNB, comprising:
a processing module to:
monitor a traffic loading metric at the macro eNB of the HetNet or through at least one of a plurality of neighboring small eNBs of the HetNet for a specified traffic loading condition based on respective UL-DL subframe configuration information exchanged between the macro eNB and the plurality of neighboring small eNBs;
determine that the specified traffic loading condition exists;
offload, in response to said determining, traffic scheduled for a macro user equipment (UE) from one or more macro subframes of a UL-DL subframe configuration of the macro eNB to one or more FlexSFs of a plurality of independent UL-DL subframe configurations of the plurality of neighboring small eNBs to avoid or mitigate a DL-UL interference between the macro eNB and the plurality of neighboring small eNBs;
wherein the one or more macro subframes are muted and the one or more macro subframes are at subframe positions of the UL-DL subframe configuration of the macro eNB that are equal to corresponding subframe positions of the one or more FlexSFs in the plurality of independent UL-DL subframe configurations of the neighboring small eNBs, and
wherein the one or more macro subframes and the corresponding one or more FlexSFs are downlink subframes when the traffic scheduled is downlink traffic and uplink subframes when the traffic scheduled is uplink traffic.

13. The node device of claim 12, wherein the processing module is further operable to offload uplink (UL) traffic to one of the plurality of neighboring small eNBs when a determination is made to increase a number of downlink (DL) subframes in the HetNet, or the processing module is further operable to offload DL traffic to one of the plurality of neighboring small eNBs when a determination is made to increase a number of UL subframes in the HetNet.

14. The node device of claim 12, wherein the muted data transmission uses a regular subframe or an almost blank subframe (ABS), and wherein the one or more FlexSFs are selected from the group consisting of subframes 3, 4, 7, 8, 9, and a subframe configured to allow opposite transmission directions.

15. The node device of claim 12, wherein the processing module is further configured to, trigger a request to one or more of the plurality of neighboring small eNBs to use a UL-DL adaption set, trigger a request to one or more of the plurality of neighboring small eNBs to perform cell clustering interference mitigation (CCIM), or trigger a request to one or more of the plurality of neighboring small eNBs to reduce a transmission power on a FlexSF configured as the DL subframe at one or more of the plurality of neighboring small eNBs.

16. The node device of claim 12, wherein the transceiver module is further configured to communicate with one or more of the plurality of neighboring small eNBs via X2 signaling or backhaul link signaling via a wireless channel, a wired connection or an optical fiber connection, and the node is selected from the group consisting of a base station (BS), a Node B (NB), an evolved Node B (eNB), a baseband unit (BBU), a remote radio head (RRH), a remote radio equipment (RRE), a remote radio unit (RRU), a central processing module (CPM), and combinations thereof, and one or more of the plurality of neighboring small eNBs are selected from the group consisting of a low power node (LPN), a micro eNB, a pico eNB, a femto-eNB, a home eNB (HeNB), a remote radio head (RRH), a remote radio equipment (RRE), a remote radio unit (RRU), and combinations thereof.

17. The node device of claim 12, wherein:
the transceiver module is further configured to: receive MUE traffic requirements,
request channel quality measurements from the MUE on small cells of the plurality of neighboring small eNBs, and
receive channel quality measurements of the small cells from the MUE; and
the processing module is further configured to determine the traffic to offload based on at least one of the channel quality measurements of the small cells and MUE traffic requirements, wherein the MUE traffic requirements includes an amount of data to be transmitted or a quality of service (QoS) parameter for the MUE packet.

18. The node device of claim 12, wherein:
the offloading is performed using a semi-static mechanism or dynamic signaling, wherein
the semi-static mechanism uses enhanced inter-cell interference coordination (eICIC) with a large reference signal received power (RSRP) bias, overload indication (OI), or high interference indication (HII), and
the dynamic signaling includes physical or higher layer signaling indicating the offloading of the transmission.

19. A node device of a small evolved Node B (eNB) configured to adapt uplink-downlink (UL-DL) time-division duplexing (TDD) subframe configurations in a heterogeneous network (HetNet), comprising:
a transceiver module to receive a UL-DL subframe configuration of a macro eNB from the macro eNB; and
a processing module to:
generate a pico UL-DL adaption set such that DL subframes of the UL-DL subframe configuration of the macro eNB are a subset of the DL subframes of the pico UL-DL adaption set,
communicate traffic scheduled for the macro eNB,
wherein the scheduled traffic is offloaded from one or more macro subframes of the UL-DL subframe configuration of the macro eNB to one or more flexible subframes (FlexSFs) of one of the UL-DL subframe congurations included in the pico UL-DL adaptation set in order to avoid or mitigate DL-UL interference between the macro eNB and the small eNB;

wherein the one or more macro subframes are muted and the one or more FlexSFs are at subframe positions that are equal to corresponding subframe positions of the one or more macro subframes of the UL-DL subframe configuration of the macro eNB, and the one or more Flex-SFs are configured to vary as one of a downlink subframe or an uplink subframe based on the pico UL-DL adaption set, wherein the one or more macro subframes and the corresponding one or more FlexSFs are downlink subframes when the traffic scheduled is downlink traffic and uplink subframes when the traffic scheduled is uplink traffic, and wherein the offloading is based on a monitoring of a traffic loading metric performed through the small eNB.

20. The node device of claim 19, wherein the transceiver module is further operable to receive UL traffic from the MUE to increase a DL packet throughput in the HetNet, or the transceiver module is further operable to transmit the DL traffic to the MUE to increase a UL packet throughput in the HetNet.

21. The node device of claim 19, wherein the transceiver module is further configured to reduce a transmission power on traffic of the one or more FlexSFs that are configured as DL subframes, wherein the one or more FlexSFs include at least one of subframes 3, 4, 7, 8, 9, and a subframe configured to allow opposite transmission directions.

22. The node device of claim 19, further comprising using cell clustering interference mitigation (CCIM) wherein:

the transceiver module is further configured to measure node-to-node channel interference between small cells, communicate with at least one other small eNB, and collect node-to-node channel interference measurements from the at least one other small eNB; and the processing module is further operable to determine interference mitigation (IM) cell clusters based on the collected node-to-node channel interference measurements from small cells of the at least one other small eNB and configure the small cells in each IM cell cluster with a same UL-DL subframe configuration, wherein the small cells generating interference on each other above a specified threshold are grouped together in a same IM cluster, and the specified threshold is based on inter-cell coupling loss or an estimated node-to-node pathloss.

23. The node device of claim 19, wherein the transceiver module is further configured to communicate with the macro eNB and other small eNBs via X2 signaling or backhaul link signaling via a wireless channel, wired connection or an optical fiber connection, and the small eNB includes a low power node (LPN), a micro eNB, a pico eNB, a femto-eNB, a home eNB (HeNB), a remote radio head (RRH), a remote radio equipment (RRE), or a remote radio unit (RRU).

* * * * *